(12) United States Patent
Hayes et al.

(10) Patent No.: US 11,776,391 B2
(45) Date of Patent: Oct. 3, 2023

(54) GENERATING AND TRANSMITTING PARKING INSTRUCTIONS FOR AUTONOMOUS AND NON-AUTONOMOUS VEHICLES

(71) Applicant: Allstate Insurance Company, Northbrook, IL (US)

(72) Inventors: Howard Hayes, Glencoe, IL (US); Regina Madigan, Mountain View, CA (US); Surender Kumar, Palatine, IL (US); Mark V. Slusar, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/701,423

(22) Filed: Mar. 22, 2022

(65) Prior Publication Data

US 2023/0038879 A1    Feb. 9, 2023

Related U.S. Application Data

(63) Continuation of application No. 16/597,421, filed on Oct. 9, 2019, now Pat. No. 11,281,218, which is a
(Continued)

(51) Int. Cl.
*G05D 1/00* (2006.01)
*G08G 5/00* (2006.01)
(Continued)

(52) U.S. Cl.
CPC ......... *G08G 1/0112* (2013.01); *G05D 1/0088* (2013.01); *G05D 1/0212* (2013.01);
(Continued)

(58) Field of Classification Search
CPC .. G08G 1/0112; G08G 1/0116; G08G 1/0133; G08G 1/0141; G08G 1/143;
(Continued)

(56) References Cited

U.S. PATENT DOCUMENTS 6,064,970 A    5/2000  McMillan et al.
7,343,306 B1    3/2008  Bates et al.
(Continued)

FOREIGN PATENT DOCUMENTS

CA        2337780 A1    10/2001
CN     103164975 A     6/2013
(Continued)

OTHER PUBLICATIONS

Aug. 27, 2018—U.S. Non-Final Office Action—U.S. Appl. No. 15/240,037, 27 pages.
(Continued)

*Primary Examiner* — Yonel Beaulieu
(74) *Attorney, Agent, or Firm* — Polsinelli PC

(57) ABSTRACT

Systems and apparatuses for receiving data from a plurality of sensors and using the data, as well as other data, to generate a parking recommendation for an autonomous vehicle and instruct the autonomous vehicle to travel to the recommended parking location are provided. Data may be received from a plurality of sensors within a first autonomous vehicle, as well as from other vehicles and/or structures. Historical parking data associated with the first autonomous vehicle may also be extracted. In some examples, an expected future trip of the first autonomous vehicle may be determined. The system may then evaluate the data to generate a parking recommendation for the first autonomous vehicle. The system may generate and transmit instructions for traveling from a current location to the recommended parking location and may cause the first
(Continued)

autonomous vehicle to travel to the recommended parking location.

20 Claims, 17 Drawing Sheets

Related U.S. Application Data continuation of application No. 15/713,471, filed on Sep. 22, 2017, now Pat. No. 10,459,442, which is a continuation of application No. 15/240,019, filed on Aug. 18, 2016, now Pat. No. 9,811,085.

(51) Int. Cl.
  *G06N 5/04* (2023.01)
  *B62D 15/00* (2006.01)
  *G08G 1/01* (2006.01)
  *G08G 1/14* (2006.01)
  *G05D 1/02* (2020.01)

(52) U.S. Cl.
  CPC .............. *G05D 1/0278* (2013.01); *G06N 5/04* (2013.01); *G08G 1/0116* (2013.01); *G08G 1/0133* (2013.01); *G08G 1/0141* (2013.01); *G08G 1/143* (2013.01); *G08G 1/144* (2013.01); *G08G 1/148* (2013.01)

(58) Field of Classification Search
  CPC .......... G08G 1/144; G08G 1/148; G08G 5/00; G05D 1/0088; G05D 1/0212; G05D 1/0278; G05D 1/00; G06N 5/04; B62D 15/00; B62D 15/027; B62D 15/0285
  See application file for complete search history.

(56) References Cited

U.S. PATENT DOCUMENTS

| | | | |
|---|---|---|---|
| 7,979,173 B2 | 7/2011 | Breed | |
| 8,140,265 B2 | 3/2012 | Grush | |
| 8,180,655 B1 | 5/2012 | Hopkins, III | |
| 8,595,034 B2 | 11/2013 | Bauer et al. | |
| 8,874,317 B2 | 10/2014 | Marczok et al. | |
| 9,019,092 B1 | 4/2015 | Brandmaier et al. | |
| 9,141,995 B1 | 9/2015 | Brinkmann et al. | |
| 9,230,440 B1 | 1/2016 | Penilla et al. | |
| 9,245,333 B1 | 1/2016 | Beck et al. | |
| 9,457,717 B2 | 10/2016 | Marczok et al. | |
| 9,758,092 B2 | 9/2017 | Pal et al. | |
| 9,811,085 B1 | 11/2017 | Hayes et al. | |
| 9,944,282 B1 | 4/2018 | Fields et al. | |
| 10,386,845 B1 | 8/2019 | Konrardy et al. | |
| 10,459,442 B1 * | 10/2019 | Hayes .................. | G05D 1/0278 |
| 10,528,829 B2 | 1/2020 | Kim et al. | |
| 10,532,744 B2 | 1/2020 | Tuukkanen et al. | |
| 11,281,218 B1 * | 3/2022 | Hayes .................. | G08G 1/0133 |
| 2002/0099574 A1 | 7/2002 | Cahill et al. | |
| 2005/0207876 A1 | 9/2005 | Springwater | |
| 2006/0228197 A1 | 10/2006 | Springwater | |
| 2006/0250278 A1 | 11/2006 | Tillotson et al. | |
| 2011/0161116 A1 | 6/2011 | Peak et al. | |
| 2013/0293394 A1 | 11/2013 | Rubin et al. | |
| 2014/0058711 A1 | 2/2014 | Scofield | |
| 2014/0266805 A1 | 9/2014 | Tippelhofer et al. | |
| 2014/0350970 A1 | 11/2014 | Schumann, Jr. et al. | |
| 2014/0365246 A1 | 12/2014 | Hayward et al. | |
| 2015/0066545 A1 | 3/2015 | Kotecha et al. | |
| 2015/0081174 A1 | 3/2015 | Marczok et al. | |
| 2015/0187019 A1 | 7/2015 | Fernandes et al. | |
| 2015/0346718 A1 | 12/2015 | Stenneth | |
| 2016/0018822 A1 | 1/2016 | Nevdahs et al. | |
| 2016/0055748 A1 | 2/2016 | Barnes et al. | |
| 2016/0129883 A1 | 5/2016 | Penilla et al. | |
| 2016/0189435 A1 | 6/2016 | Beaurepaire | |
| 2016/0238399 A1 | 8/2016 | Caira | |
| 2016/0253748 A1 | 9/2016 | Levy et al. | |
| 2016/0320193 A1 | 11/2016 | Tuukkanen et al. | |
| 2016/0371607 A1 | 12/2016 | Rosen et al. | |
| 2017/0004710 A1 | 1/2017 | Dozono et al. | |
| 2017/0015355 A1 | 1/2017 | Marczok et al. | |
| 2017/0025008 A1 | 1/2017 | Gignac et al. | |
| 2017/0206471 A1 | 7/2017 | Dermosessian | |
| 2017/0236417 A1 | 8/2017 | Carrara | |
| 2017/0351975 A1 | 12/2017 | Webb | |
| 2018/0053237 A1 | 2/2018 | Hayes et al. | |
| 2018/0194343 A1 | 7/2018 | Lorenz | |
| 2020/0234582 A1 | 7/2020 | Mintz | |

FOREIGN PATENT DOCUMENTS

| | | |
|---|---|---|
| EP | 2869282 A1 | 5/2015 |
| WO | WO-2012063268 A2 | 5/2012 |

OTHER PUBLICATIONS

Jul. 24, 2018—U.S. Non-Final Office Action—U.S. Appl. No. 15/239,983, 23 pages.
Aug. 29, 2019—U.S. Final Office Action—U.S. Appl. No. 15/239,983, 29 Pages.
Jul. 23, 2019—U.S. Non-Final Office Action—U.S. Appl. No. 15/240,037, 31 Pages.
Mar. 15, 2019—U.S. Final Office Action—U.S. Appl. No. 15/240,037, 39 Pages.
May 21, 2019—U.S. Non-Final Office Action—U.S. Appl. No. 15/239,983, 34 Pages.
Jan. 14, 2020—(CA) Examiner Report—App. No. 3,033,215, 8 pages.
Delbridge E., "Parked Car Insurance," Coverage Information, Dec. 15, 2014, Retrieved from URL: http://carinsurance.about.com/od/CarInsurance/a/Parked-Car-Insurance.htm, Accessed on Apr. 29, 2016, 5 pages.
"Does Parking on the Street Affect Your Car Insurance?," carautoinsurance, Retrieved from URL: http://www.carautoinsurance.co.za/does-parking-on-the-street-affect-your-car-insurance.htm, Accessed on Apr. 29, 2016, 3 pages.
Extended European Search Report for European Application No. 17842168.1 dated Apr. 3, 2020, 10 pages.
International Search Report and Written Opinion for International Application No. PCT/US2017/047492, dated Sep. 22, 2017, 6 Pages.

* cited by examiner

Parking Preferences

| | |
|---|---|
| Distance to walk: | 4 Blocks |
| Model year threshold: | 2 years |
| Automatic modification: | On |

Cancel | Accept

FIG. 7

Your recommended parking location is:

The 400 block of Main Street, in front of 403 Main Street

The cost associated with this parking location is:

$1.00/hr

Decline | Accept

FIG. 8

GENERATING AND TRANSMITTING PARKING INSTRUCTIONS FOR AUTONOMOUS AND NON-AUTONOMOUS VEHICLES

CROSS REFERENCE TO RELATED APPLICATIONS

This application is a continuation of U.S. patent application Ser. No. 16/597,421 filed on Oct. 9, 2019, and entitled "Generating and Transmitting Parking Instructions for Autonomous and Non-Autonomous Vehicles," which is a continuation of U.S. patent application Ser. No. 15/713,471 filed on Sep. 22, 2017, and entitled "Generating and Transmitting Parking Instructions for Autonomous and Non-Autonomous Vehicles," which is a continuation of U.S. patent application Ser. No. 15/240,019, now U.S. Pat. No. 9,811,085, filed on Aug. 18, 2016, and entitled, "Generating and Transmitting Parking Instructions for Autonomous and Non-Autonomous Vehicles," which relates to U.S. patent application Ser. No. 15/239,983, now U.S. Pat. No. 11,425,530, filed on Aug. 18, 2016, and entitled, "Generating and Transmitting Parking Instructions for Autonomous and Non-Autonomous Vehicles," and U.S. patent application Ser. No. 15/240,037 filed on Aug. 18, 2016, and entitled, "Generating and Transmitting Parking Instructions for Autonomous and Non-Autonomous Vehicles," each of which is incorporated herein by reference in its entirety.

TECHNICAL FIELD

Aspects of the disclosure generally relate to one or more computer systems, servers, and or other devices including hardware and/or software. In particular, aspects are directed to generating parking recommendations and transmitting recommendations and/or instructions to a vehicle.

BACKGROUND

Many vehicles include sophisticated sensors and advanced internal computer systems designed to monitor and control vehicle operations and driving functions, as well as other data including environmental conditions, parking histories, and the like. In addition, the use of vehicle-to-vehicle (V2V) and vehicle-to-infrastructure (V2I) communications have enabled systems to evaluate data from not only one vehicle in communication with an evaluation system, but a plurality of vehicles. This technology may be used to improve driver safety and an overall driving experience for autonomous, semi-autonomous and non-autonomous vehicles.

In particular, identifying parking locations near to a user's destination may be difficult, especially in large cities where parking availability may be limited. Accordingly, the processing of data from various sensors in vehicle and non-vehicle structures, may aid in efficiently identifying available parking, generating a parking recommendation and/or communicating the recommendation to a vehicle.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, systems, and apparatuses for receiving data from a plurality of sensors and using the data, as well as other data, to generate a parking recommendation for an autonomous vehicle and instruct the autonomous vehicle to travel to the recommended parking location. For example, data may be received from a plurality of sensors within a first autonomous vehicle for which a parking recommendation may be generated, as well as from other vehicles and/or structures. Historical parking data associated with the first autonomous vehicle may also be extracted.

In some examples, an expected future trip of the first autonomous vehicle may be determined. The system may then evaluate the received/extracted data, as well as data associated with the expected future trip, to generate a parking recommendation for the first autonomous vehicle. The system may generate and transmit instructions for traveling from a current location to the recommended parking location and may cause the first autonomous vehicle to travel to the recommended parking location.

In some examples, additional aspects such as maintenance needs of the first autonomous vehicle or an imminent weather event may be considered when generating the parking recommendation.

These and other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 7-10 illustrate example user interfaces that may be used with various aspect and features described herein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

One or more aspects described herein may be related to efficiently generating parking recommendations, managing parking recommendations, and the like. Various computing devices, servers, and the like, may be used to collect and/or process data, extract data from one or more databases, and generate a parking recommendation. In some examples, the parking recommendation may be transmitted to a computing device associated with the vehicle for which parking is being requested or associated with a user associated with the vehicle. These and various other aspects will be described more fully herein.

Figure 1:
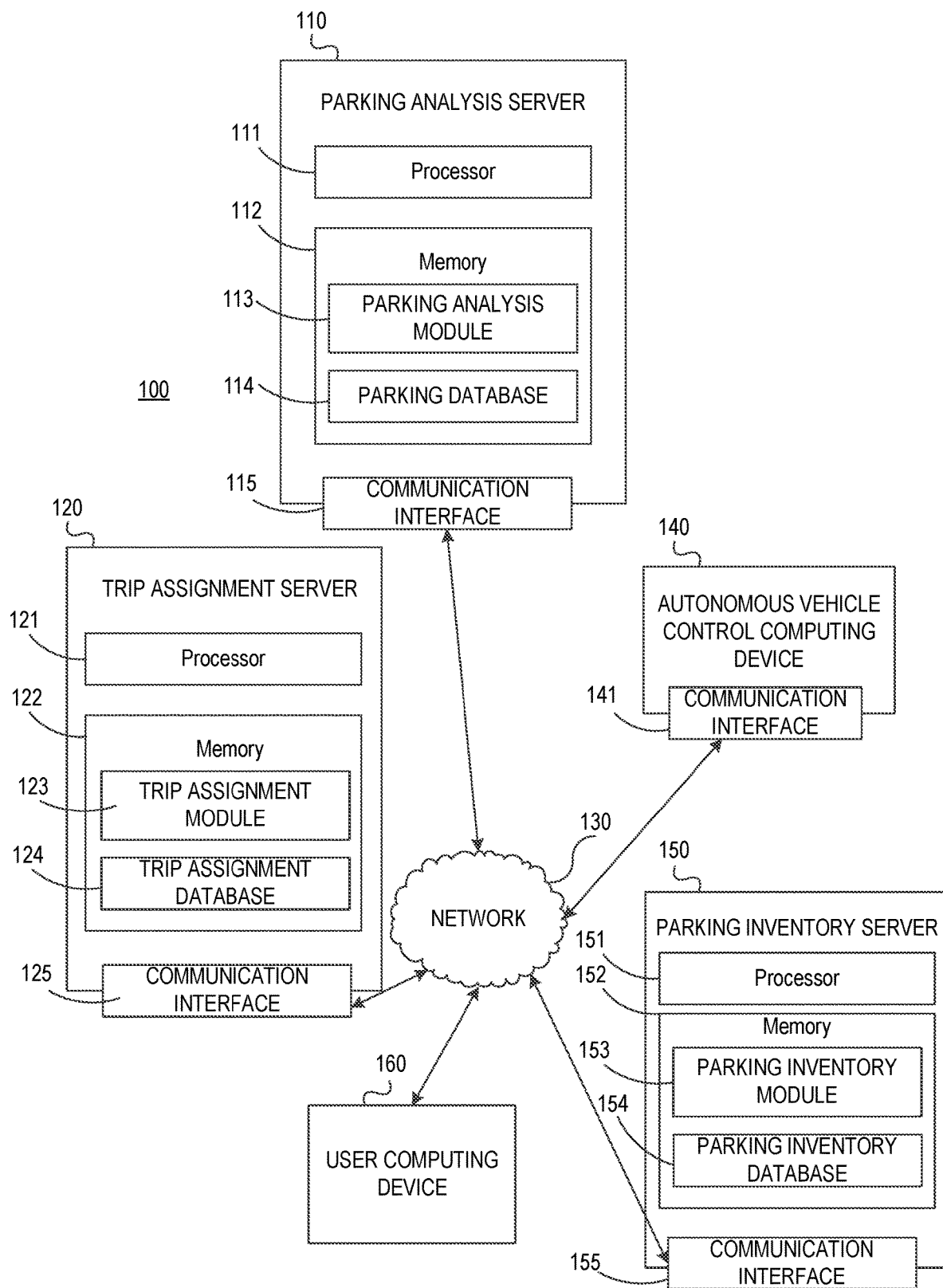
FIG. 1 illustrates an environment including illustrative servers, computing devices, and the like, for performing various parking analysis functions, generating parking recommendations, transmitting instructions for vehicles to travel to a recommended parking location, and the like, according to one or more aspects described herein.

FIG. 1 depicts an environment 100 including illustrative servers, computing devices, and the like, for performing various parking analysis functions, generating parking recommendations, transmitting instructions for vehicles to travel to a recommended parking location, and the like, according to one or more aspects described herein. For instance, the environment 100 includes a parking analysis server 110, a trip assignment server 120, an autonomous vehicle control computing device 140, a parking inventory server 150 and/or a user computing device 160. The various devices, servers, and the like, may be connected or in communication with each other via a network 130. The network 130 may be a private network (e.g., a network owned and/or operated by an entity, such as an insurance provider) or may be a public network (e.g., a public network providing, in some examples, secure communication between devices).

The parking analysis server 110 may include may include one or more processors 111, memory 112, and communication interface 115. A data bus may interconnect processor(s) 111, memory 112, and communication interface 115. Communication interface 115 may be a network interface configured to support communication between parking analysis server 110 and one or more networks (e.g., network 130). Memory 112 may include one or more program modules having instructions that when executed by processor(s) 111 cause parking analysis server 110 to perform one or more functions described herein. In some instances, the one or more program modules and/or databases may be stored by and/or maintained in different memory units of parking analysis server 110 and/or by different computer systems or devices that may form and/or otherwise make up the parking analysis server 110. In some arrangements, different features or processes performed may be performed by different sets of instructions, such that the processor may execute each desired set of instructions to perform different functions described herein.

For example, memory 112 may include a parking analysis module 113. The parking analysis module 113 may include hardware and/or software configured to perform various functions within the parking analysis server 110. For instance, the parking analysis module may collect data, such as raw data (e.g., signals) and process the data to evaluate a one or more parking locations. The parking analysis module 113 may receive data from a first vehicle for which a parking recommendation is being generated, as well as one or more other vehicles (e.g., autonomous, semi-autonomous, and/or non-autonomous vehicles) that are determined to be within a predefined proximity of the first vehicle, have historical parking data associated with one or more parking locations being evaluated, and the like.

The data received by the parking analysis module 113 may be from a plurality of sensors arranged in the first vehicle as well as the one or more other vehicles. As will be discussed more fully herein, sensors for detecting operational data of the vehicle, environmental conditions surrounding the vehicle, etc. may be used to collect raw data that may be processed by the parking analysis module 113. In some examples, data may also be received from one or more structures, such as parking lots, parking garages, bridges, roadways, buildings, and the like. This data may also be processed and/or analyzed to evaluate potential parking locations.

The parking analysis module 113 may also retrieve historical parking and/or driving information from parking database 114. The parking database may include historical information associated with one or more neighborhoods (e.g., as sorted by zip code, city, town, or other geographic definition), specific parking locations (e.g., as identified by global positioning system (GPS) data), vehicles, roads, road segments, drivers, and the like. For instance, the historical data may include incidents of crime in an area, parking location, or the like. The historical data may also include accident information for a vehicle, vehicle or driver insurance claim information, and the like. This information may be aggregated with the sensor data collected and processed to evaluate one or more potential parking locations.

For instance, the parking analysis module 113 may evaluate the data collected and retrieved and may identify one or more recommended parking locations (e.g., via address, GPS location information, or the like) to recommend to a vehicle and/or driver. The recommended parking location may be determined and transmitted to a user computing device 160 associated with the vehicle for which the parking recommendation is being generated. In some examples, the user computing device 160 may be a mobile computing device such as a smartphone, cell phone, tablet computer, laptop computer, or the like. Additionally or alternatively, the user computing device 160 may be an on-board vehicle computing device that may include a display within a vehicle and, in some examples, may control operation of one or more vehicle systems or may be connected to or in communication with a computing device controlling operation of one or more vehicle systems.

The parking analysis module 113 may be able to evaluate a plurality of potential parking locations for a plurality of vehicles simultaneously and in real-time in order to effectively manage parking without recommending a same parking location for more than one vehicle. For instance, the parking analysis module 113 may be able to effectively track parking recommendations, acceptances, requests, and the like, to control recommendations made to avoid recommending the same spot to multiple vehicles.

As indicated above, environment 100 may further include a trip assignment server 120.

The trip assignment server 120 may include may include one or more processors 121, memory 122, and communication interface 125. A data bus may interconnect processor(s) 121, memory 122, and communication interface 125. Communication interface 125 may be a network interface configured to support communication between trip assignment server 120 and one or more networks (e.g., network 130). Memory 122 may include one or more program modules having instructions that when executed by processor(s) 121 cause trip assignment server 120 to perform one or more functions described herein. In some instances, the one or more program modules and/or databases may be stored by and/or maintained in different memory units of trip assignment server 120 and/or by different computer systems or devices that may form and/or otherwise make up the trip assignment server 120. In some arrangements, different features or processes performed may be performed by different sets of instructions, such that the processor may execute each desired set of instructions to perform different functions described herein.

For example, memory 122 may include a trip assignment module 123. The trip assignment module 123 may include hardware and/or software configured to perform various functions. For instance, the trip assignment module 123 may manage trip assignments for a plurality of autonomous vehicles. For instance, location information (e.g., GPS data), historical trip information, and the like, for a plurality of autonomous vehicles may be stored in a trip assignment database 124. The trip assignment module 123 may use this information to identify potential future trips and/or assign trips to a particular vehicle. For example, the trip assignment module 123 may be in communication with a user computing device 160 which may store a calendar for a user. This information may be used to anticipate future trips (e.g., date and time of departure, location of departure, location of drop off, duration of wait between drop off and pick up (e.g., expected time parked)) and the like.

In another example, the trip assignment module 123 may anticipate vehicle assignments based on historical trip assignment data. For instance, if a user requests a vehicle at a same or substantially the same time every day (or every Wednesday, for example) the trip assignment module 123 may anticipate that trip and may tentatively assign a vehicle in anticipation of the trip.

Various other ways of anticipating trip assignments or assigning trips may be used without departing from the invention. These and various other trip assignment functions will be discussed more fully herein.

The environment 100 may further include an autonomous vehicle control computing device 140. The autonomous vehicle control computing device 140 may include hardware and/or software configured to control one or more systems of an autonomous vehicle. For instance, the autonomous vehicle control computing device 140 may control speed of an autonomous vehicle, braking, lane changes, direction or navigation of the vehicle, and the like. In some examples, the autonomous vehicle control computing device 140 may receive GPS location coordinates, or other location information, for a recommended parking location (e.g., from parking analysis server). The recommended parking location information received may also include instructions to travel to the recommended parking location, as will be discussed more fully herein.

Environment 100 may further include a parking inventory server 150. The parking inventory server 150 may include may include one or more processors 151, memory 152, and communication interface 155. A data bus may interconnect processor(s) 151, memory 152, and communication interface 155. Communication interface 155 may be a network interface configured to support communication between parking inventory server 150 and one or more networks (e.g., network 130). Memory 152 may include one or more program modules having instructions that when executed by processor(s) 151 cause parking inventory server 150 to perform one or more functions described herein. In some instances, the one or more program modules and/or databases may be stored by and/or maintained in different memory units of parking inventory server 150 and/or by different computer systems or devices that may form and/or otherwise make up the parking inventory server 150. In some arrangements, different features or processes performed may be performed by different sets of instructions, such that the processor may execute each desired set of instructions to perform different functions described herein.

For instance, memory 152 may include a parking inventory module 153. The parking inventory module 153 may include hardware and/or software configured to perform various functions. For instance, the parking inventory module 153 may retrieve current parking availability data from parking inventory database 154 and match the available inventory to one or more requests for a parking location.

Additionally or alternatively, the parking inventory module 153 may be configured to receive data associated with available parking locations (e.g., GPS or other location information, time and/or date of availability, and the like), for instance, from one or more owners or users associated with the parking locations, may determine or receive a cost associated with parking in the various parking locations, and/or may assist in providing one or more recommended parking locations (e.g., to the parking analysis module), as will be discussed more fully herein.

Figure 2:
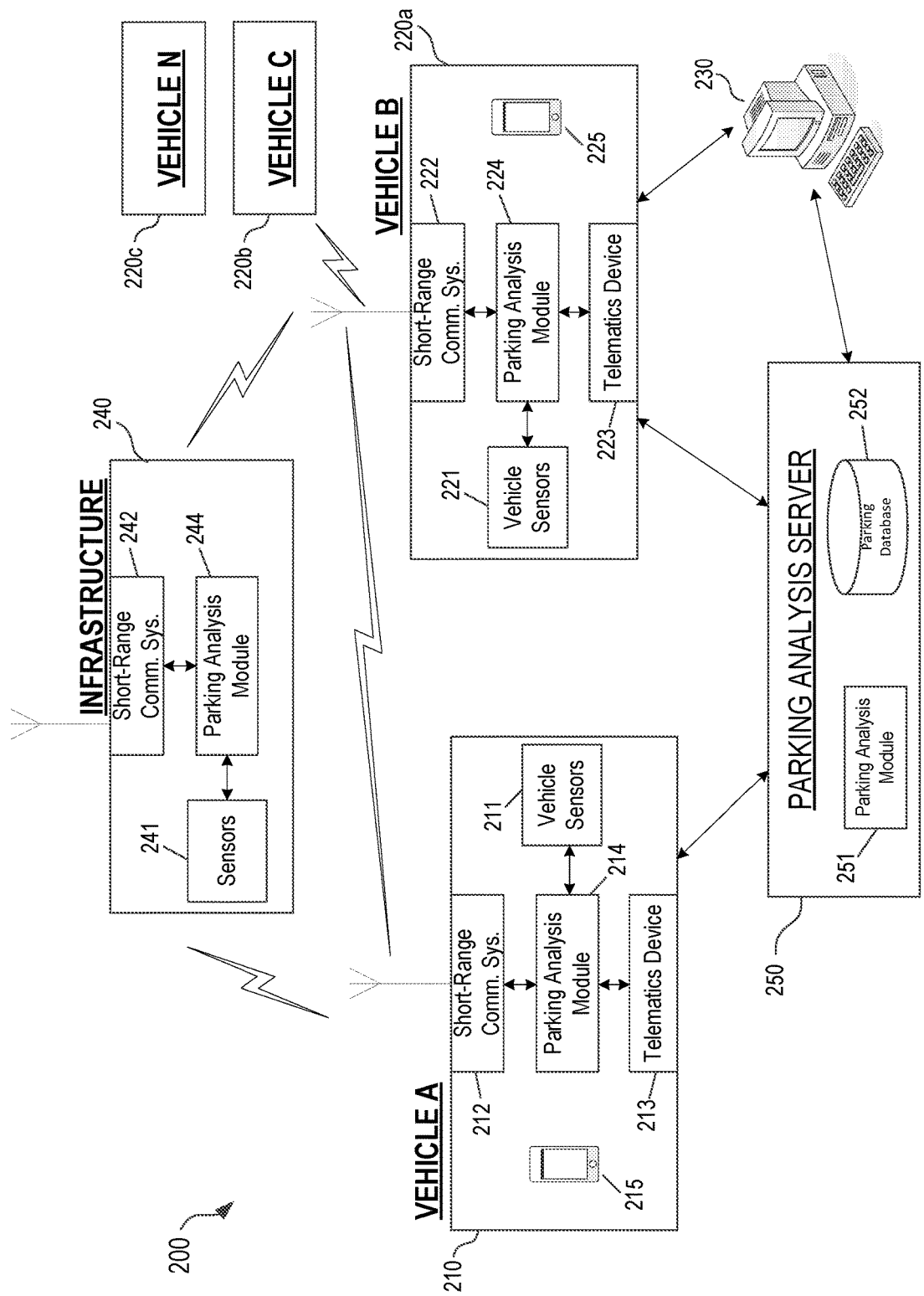
FIG. 2 is a diagram illustrating various components and devices of a parking analysis system according to one or more aspects described herein.

FIG. 2 is a diagram of an illustrative parking analysis system 200 including a first vehicle 210 and a plurality of other vehicles (e.g., vehicles B-N) 220a-220c, infrastructure 240, a parking analysis server 250, and additional related components. Each component shown in FIG. 2 may be implemented in hardware, software, or a combination of the two. Additionally, each component of the parking analysis system 200 may include a computing device (or system) having some or all of the structural components described herein for computing device 1101 in FIG. 11. The parking analysis system 200 may also include or be in communication with one or more servers, devices, and the like, shown and described with respect to FIG. 1.

Vehicles 210 and 220a-220c in the parking analysis system 200 may be, for example, automobiles, motorcycles, scooters, buses, recreational vehicles, boats, or other vehicles for which a vehicle driving and/or parking data may be analyzed. Vehicle C 200b and vehicle N 200c may be configured similarly to or include the same or similar components to those described with respect to Vehicle B 220a.

The vehicles 210 and 220a-220c each include vehicle operation sensors 211 and 221 capable of detecting and recording various conditions at the vehicle and operational parameters of the vehicle. For example, sensors 211 and 221 may detect and store data corresponding to the vehicle's location (e.g., GPS coordinates), speed and direction, rates of acceleration or braking, and specific instances of sudden acceleration, braking, and swerving. Sensors 211 and 221 also may detect and store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 211 and 221 may detect and store the external driving conditions, for example, external temperature, rain, snow, light levels, and sun position for driver visibility. For example, external cameras and proximity sensors 211 and 221 may detect other nearby vehicles, traffic levels, road conditions, traffic obstructions, animals, cyclists, pedestrians, whether the vehicle is within an enclosed space such as a garage, parking garage, or the like, and other conditions that may factor into parking analysis. Sensors 211 and 221 also may detect and store data relating to moving violations and the observance of traffic signals and signs by the vehicles 210 and 220. Additional sensors 211 and 221 may detect and store data relating to the maintenance of the vehicles 210 and 220, such as the engine status, oil level, engine coolant temperature, odometer reading, the level of fuel in the fuel tank, engine revolutions per minute (RPMs), and/or tire pressure.

Vehicles sensors 211 and 221 also may include cameras and/or proximity sensors capable of recording additional conditions inside or outside of the vehicles 210 and 220. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, unsecured objects in the vehicle, etc.). Sensors 211 and 221 also may be configured to collect data associated with a driver's movements or the condition of a driver. For example, vehicles 210 and 220 may include sensors that monitor a driver's movements, such as the driver's eye position and/or head position, etc. Additional sensors 211 and 221 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

Certain vehicle sensors 211 and 221 also may collect information regarding the driver's route choice, whether the driver follows a given route, and to classify the type of trip (e.g. commute, errand, new route, etc.). In certain embodiments, sensors and/or cameras 211 and 221 may determine when and how often the vehicles 210 and 220 stay in a single lane or stray into other lanes. A Global Positioning System (GPS), locational sensors positioned inside the vehicles 210 and 220, and/or locational sensors or devices external to the vehicles 210 and 220 may be used determine the route, lane position, and other vehicle position/location data.

The data collected by vehicle sensors 211 and 221 may be stored and/or analyzed within the respective vehicles 210 and 220, and/or may be transmitted to one or more external devices. For example, as shown in FIG. 2, sensor data may be transmitted via short-range communication systems 212 and 222 to other nearby vehicles. Additionally, the sensor data may be transmitted via telematics devices 213 and 223 to one or more remote computing devices, such as driving analysis server 250.

Short-range communication systems 212 and 222 are vehicle-based data transmission systems configured to transmit vehicle operational data to other nearby vehicles, and to receive vehicle operational data from other nearby vehicles. In some examples, communication systems 212 and 222 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems 212 and 222 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication systems 212 and 222 may be sent via DSRC, Bluetooth, satellite, GSM infrared, IEEE 802.11, WiMAX, RFID, and/or any suitable wireless communication media, standards, and protocols. In certain systems, short-range communication systems 212 and 222 may include specialized hardware installed in vehicles 210 and 220 (e.g., transceivers, antennas, etc.), while in other examples the communication systems 212 and 222 may be implemented using existing vehicle hardware components (e.g., radio and satellite equipment, navigation computers) or may be implemented by software running on the mobile devices 215 and 225 of drivers and passengers within the vehicles 210 and 220.

The range of V2V communications between vehicle communication systems 212 and 222 may depend on the wireless communication standards and protocols used, the transmission/reception hardware (e.g., transceivers, power sources, antennas), and other factors. Short-range V2V communications may range from just a few feet to many miles, and different types of driving behaviors, parking preferences, and the like, may be determined depending on the range of the V2V communications.

V2V communications also may include vehicle-to-infrastructure (V2I) communications, such as transmissions to or from vehicles to or from non-vehicle receiving devices, such as infrastructure 240. For example, infrastructure 240 may include one or more of toll booths, rail road crossings, parking garages, road segments, parking lots, buildings or other structures, and/or road-side traffic monitoring devices which may include one or more sensors 241 for detecting environmental conditions (e.g., weather, lighting, etc.) as well as parking availability. Certain V2V communication systems may periodically broadcast data from a vehicle 210 to any other vehicle 220, or other infrastructure device 240 capable of receiving the communication, within the range of the vehicle's transmission capabilities. For example, a vehicle 210 may periodically broadcast (e.g., every 0.1 second, every 0.5 seconds, every second, every 5 seconds, etc.) certain vehicle operation data via its short-range communication system 212, regardless of whether or not any other vehicles or reception devices are in range. In other examples, a vehicle communication system 212 may first detect nearby vehicles and receiving devices, and may initialize communication with each by performing a handshaking transaction before beginning to transmit its vehicle operation data to the other vehicles and/or devices.

In other examples, infrastructure 240 may periodically broadcast (e.g., every 0.1 second, every 0.5 seconds, every second, every 5 seconds, etc.) certain data (e.g., parking availability, or the like) via its short-range communication system 242, regardless of whether or not any other vehicles or reception devices are in range. In other examples, communication system 242 may first detect nearby vehicles and receiving devices, and may initialize communication with each by performing a handshaking transaction before beginning to transmit its vehicle operation data to the other vehicles and/or devices.

Broadcasts from infrastructure 240 may also have varying ranges and, in some examples, infrastructure 240 may broadcast to an intermediate station which may then relay the information to the parking analysis server 250 (or other device evaluating parking). In other examples, the infrastructure 240 may broadcast directly to parking analysis server 250.

The types of vehicle operational data, vehicle driving data, vehicle parking data, infrastructure data, or the like, transmitted to or from vehicles 210 and/or 220 and/or infrastructure 240 may depend on the protocols and standards used for the V2V or V2I communication, the range of communications, and other factors. In certain examples, vehicles 210 and 220 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V (or V2I) communication system (e.g., vehicles and other reception devices) may use internal clocks with synchronized time signals, and may send transmission times within V2V (or V2I) communications, so that the receiver may calculate its distance from the transmitting node based on the difference between the transmission time and the reception time. The state or usage of the vehicle's controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's internal systems that the vehicle is skidding, that an impact has occurred, or that the vehicle's airbags have been deployed, also may be transmitted in V2V (or V2I) communications. In other examples, parking data associated with the vehicle (e.g., location, duration, etc.) may be transmitted via V2V (or V2I) communications. Additionally or alternatively, infrastructure data (e.g., parking data) may be transmitted from infrastructure 240 similarly to vehicle data via V2I communications.

In various other examples, any data collected by any vehicle sensors 211 and 221, as well as sensors 241 in infrastructure 240 potentially may be transmitted via V2V or V2I communication to other nearby vehicles or infrastructure devices receiving V2V or V2I communications from communication systems 212, 222, and 242. Further, additional vehicle driving data not from the vehicle's sensors (e.g., vehicle make/model/year information, driver insurance information, driving route information, vehicle maintenance information, driver scores, etc.) may be collected from other data sources, such as a driver's or passenger's mobile device 215 or 225, parking analysis server 250, and/or another external computer system 230, and transmitted using V2V or V2I communications to nearby vehicles and other receiving devices using communication systems 212, 222, and 242.

As shown in FIG. 2, the data collected by sensors 211 and 221 also may be transmitted to a parking analysis server 250, and one or more additional external servers and devices via telematics devices 213 and 223. Telematics devices 213 and 223 may be computing devices containing many or all of the hardware/software components as the computing device 1101 in FIG. 11. As discussed above, the telematics devices 213 and 223 may receive vehicle operation data, environmental data, parking data, and/or driving data from vehicle sensors 211 and 221, and may transmit the data to one or more external computer systems (e.g., parking analysis server 250 of an insurance company, financial institution, or other entity) over a wireless transmission network. Telematics devices 213 and 223 also may be configured to detect or determine additional types of data relating to real-time driving and the condition of the vehicles 210 and 220. In certain embodiments, the telematics devices 213 and 223 may contain or may be integral with one or more of the vehicle sensors 211 and 221. The telematics devices 213 and 223 also may store the type of their respective vehicles 210 and 220, for example, the make, model, trim (or sub-model), year, and/or engine specifications, as well as other information such as vehicle owner or driver information, insurance information, and financing information for the vehicles 210 and 220.

In the example shown in FIG. 2, telematics devices 213 and 223 may receive vehicle driving data, operational data, environmental data, and/or parking data from vehicle sensors 211 and 221, and may transmit the data to a parking analysis server 250. Parking analysis server 250 may be substantially similar to and include one or more components similar to parking analysis server 110 in FIG. 1.

In other examples, one or more of the vehicle sensors 211 and 221 may be configured to transmit data directly to a parking analysis server 250 without using a telematics device. For instance, telematics devices 213 and 223 may be configured to receive and transmit data from certain vehicle sensors 211 and 221, while other sensors may be configured to directly transmit data to a parking analysis server 250 without using the telematics device 216. Thus, telematics devices 213 and 223 may be optional in certain embodiments.

In certain embodiments, mobile computing devices 215 and 225 within the vehicles 210 and 220 may be used to collect vehicle driving data, operational data, environmental data, parking data and/or to receive vehicle driving data, operational data, environmental data, parking data, and the like, from sensors 211 and 221, and then to transmit the data to the parking analysis server 250 and other external computing devices. Mobile computing devices 215 and 225 may be, for example, mobile phones, personal digital assistants (PDAs), or tablet computers of the drivers or passengers of vehicles 210 and 220. Software applications executing on mobile devices 215 and 225 may be configured to detect certain driving data independently and/or may communicate with vehicle sensors 211 and 221 to receive additional driving data. For example, mobile devices 215 and 225 equipped with GPS functionality may determine vehicle location, speed, direction and other basic driving data without needing to communicate with the vehicle sensors 211 or 221, or any vehicle system. In other examples, software on the mobile devices 215 and 225 may be configured to receive some or all of the driving data collected by vehicle sensors 211 and 221.

When mobile computing devices 215 and 225 within the vehicles 210 and 220 are used to detect vehicle data and/or to receive vehicle data from vehicles 211 and 221, the mobile computing devices 215 and 225 may store, analyze, and/or transmit the vehicle data to one or more other devices. For example, mobile computing devices 215 and 225 may transmit vehicle driving data directly to one or more parking analysis servers 250, and thus may be used in conjunction with or instead of telematics devices 213 and 223. Additionally, mobile computing devices 215 and 225 may be configured to perform the V2V communications described above, by establishing connections and transmitting/receiving vehicle data to and from other nearby vehicles or infrastructure 240. Thus, mobile computing devices 215 and 225 may be used in conjunction with or instead of short-range communication systems 212 and 222 in some examples. Moreover, the processing components of the mobile computing devices 215 and 225 may be used to analyze vehicle driving data, environmental data, parking data, and the like, and perform other related functions. Therefore, in certain embodiments, mobile computing devices 215 and 225 may be used in conjunction with, or in place of, the parking analysis modules 214, 224, and 244.

Vehicles 210 and 220, as well as infrastructure 240 may include parking analysis modules 214, 224 and 244, which may be separate computing devices or may be integrated into one or more other components within the vehicles 210 and 220 or infrastructure 240 such as the short-range communication systems 212, 222 and 242, telematics devices 213 and 223, or the internal computing systems of vehicles 210 and 220. As discussed above, driving analysis modules 214, 224, 244 also may be implemented by computing devices independent from the vehicles 210 and 220 or infrastructure 240, such as mobile computing devices 215 and 225 of the drivers or passengers, or one or more separate computer systems 230 (e.g., a user's home or office computer). In any of these examples, the driving analysis modules 214, 224, 244 may contain some or all of the hardware/software components as the computing device 1101 in FIG. 11. Further, in certain implementations, the functionality of the parking analysis modules, such as storing and analyzing vehicle driving data, environmental data, operational data, parking data, determining parking location recommendations, and the like, may be performed in a central parking analysis server 250 rather than by individual vehicles 210 and 220. In such implementations, the vehicles 210 and 220 might only collect and transmit vehicle data to a parking analysis server 250, and thus the parking analysis modules 214, 224 and 244 may be optional.

Parking analysis modules 214, 224, 244 may be implemented in hardware and/or software configured to receive vehicle data from vehicle sensors 211 and 221, infrastructure sensors 241, short-range communication systems 212, 222, 242, telematics devices 213 and 223, and/or other data sources. After receiving the vehicle data, parking analysis modules 214, 224, 244 may perform a set of functions to analyze the data, evaluate available parking locations, generate a recommended parking location, and the like. For example, the parking analysis modules 214, 224, 244 may include one or more parking recommendation calculation algorithms, which may be executed by software running on hardware within the parking analysis modules. The parking analysis module 214 in a first vehicle 210 may use the vehicle data received from that vehicle's sensors 211, along with vehicle data for other nearby vehicles received via the short-range communication system 212, to determine a first parking location recommendation. Further descriptions and examples of the algorithms, functions, and analyses that may be executed by the parking analysis modules 214, 224, 244 are described herein.

Figure 11:
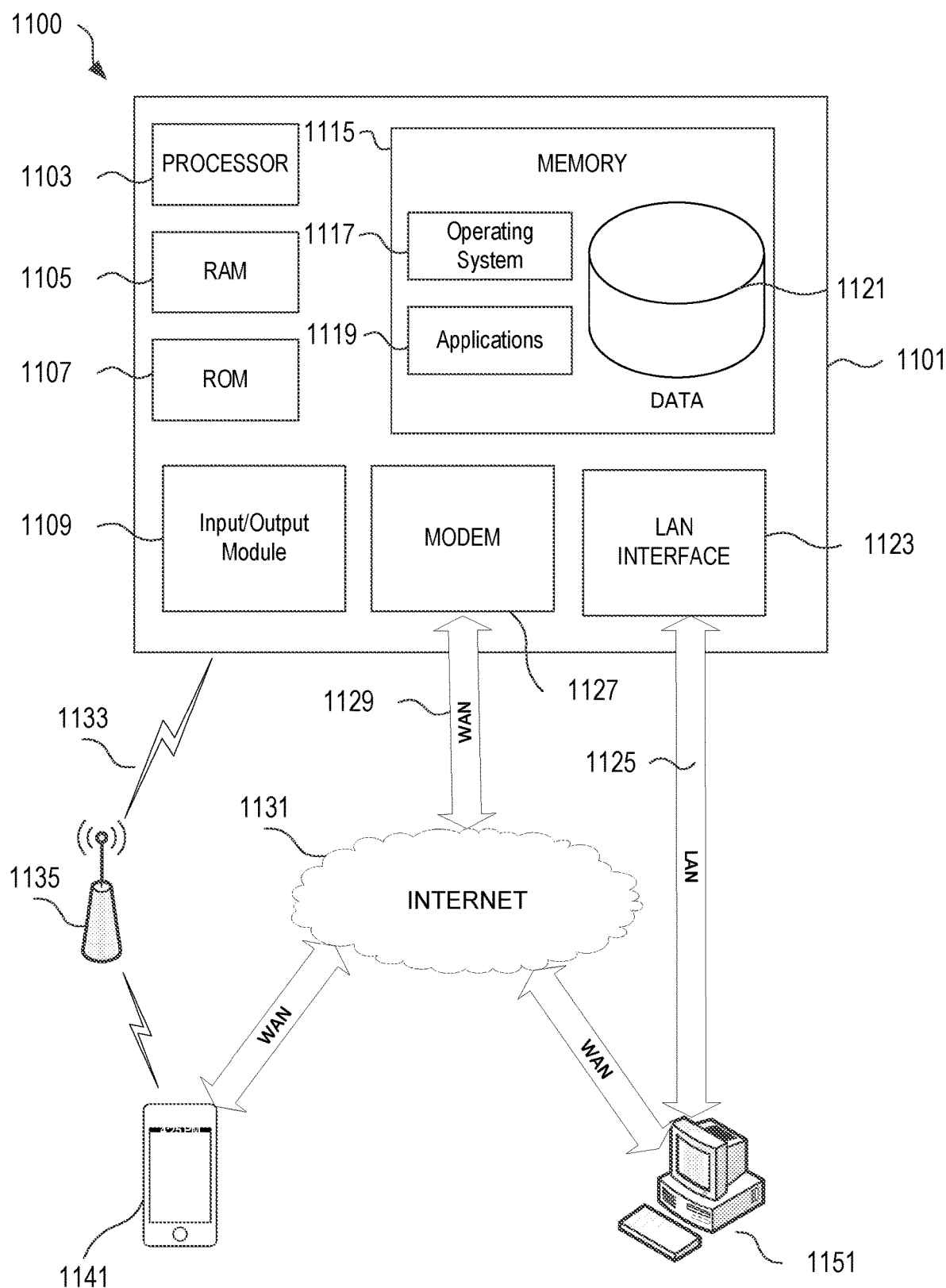
FIG. 11 illustrates a network environment and computing systems that may be used to implement aspects of the disclosure.

The system 200 also may include a parking analysis server 250, containing some or all of the hardware/software components as the computing device 1101 depicted in FIG. 11. The parking analysis server 250 may include hardware, software, and network components to receive vehicle data from one or more vehicles 210 and 220, infrastructure 240, and other data sources. The parking analysis server 250 may include a parking database 252 and parking analysis module 251 to respectively store and analyze data received from vehicles and other data sources to generate one or more parking recommendations. The parking analysis server 250 may initiate communication with and/or retrieve data from vehicles 210 and 220 wirelessly via telematics devices 213 and 223, mobile devices 215 and 225, or by way of separate computing systems (e.g., computer 230) over one or more computer networks (e.g., the Internet) and/or from infrastructure 240 via communication system 242 or via a separate computing system, such as computer 230. Additionally, the parking analysis server 250 may receive additional data relevant to generating parking recommendations from other non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.)

Data stored in the parking database 252 may be organized in any of several different manners. For example, a table in database 252 may contain all of the parking history data for a specific vehicle 210, similar to a vehicle event log. Other tables in the database 252 may store certain types of data for multiple vehicles. For instance, tables may store specific driving behaviors and interactions (e.g., accidents, tailgating, cutting-off, yielding, racing, defensive avoidances, etc.) for multiples vehicles, environmental data for various areas, parking availability data, and the like. Parking data may also be organized by time and/or place, so that the driving behaviors or interactions between multiples vehicles 210 and 220, and/or infrastructure 240, may be stored or grouped by time and location.

The parking analysis module 251 within the parking analysis server 250 may be configured to retrieve data from the parking database 252, or may receive data directly from vehicles 210 and 220, infrastructure 240, or other data sources, and may perform analysis of the data, generate parking recommendations, and other related functions. The functions performed by the parking analysis module 251 may be similar to those of parking analysis modules 214, 224 and 244, and further descriptions and examples of the algorithms, functions, and analyses that may be executed by the parking analysis module 251 are described herein.

In various examples, the data analyses, parking recommendation generation, and the like, may be performed entirely in the parking analysis module 251 of the parking analysis server 250 (in which case parking analysis modules 214, 224, 244 need not be implemented in vehicles 210 and 220 or infrastructure 244), or may be performed entirely in the vehicle-based parking analysis modules 214 and 224 (in which case the parking analysis module 251 and/or the parking analysis server 250 need not be implemented), or may be performed entirely in the infrastructure-based parking analysis module 244 (in which case vehicle-based parking analysis modules 214, 224, and/or parking analysis server 250 might not be implemented). In other examples, certain data analyses may be performed by vehicle-based driving analysis modules 214 and 224, while other data analyses are performed by the parking analysis module 251 at the parking analysis server 250.

Any of the various devices described above with respect to FIGS. 1 and 2 may be used with each other to perform the various functions described above, as well as any additional functions described herein. Nothing should be viewed as limiting the devices to only use with other devices shown in the respective figures.

Figure 3A:
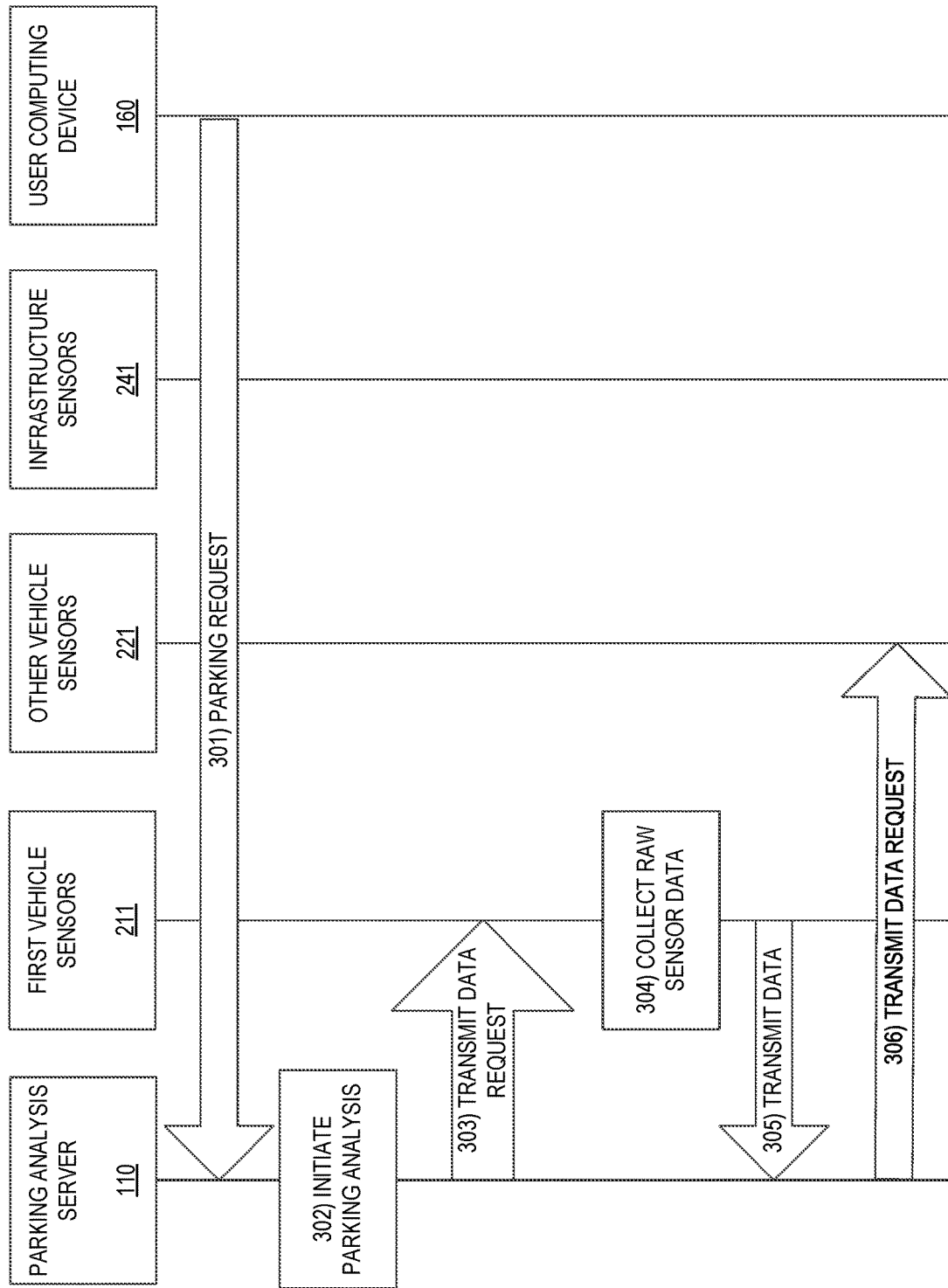
FIGS. 3A-3C depict an illustrative event sequence for generating a parking recommendation according to one or more aspects described herein.
Figure 3B:
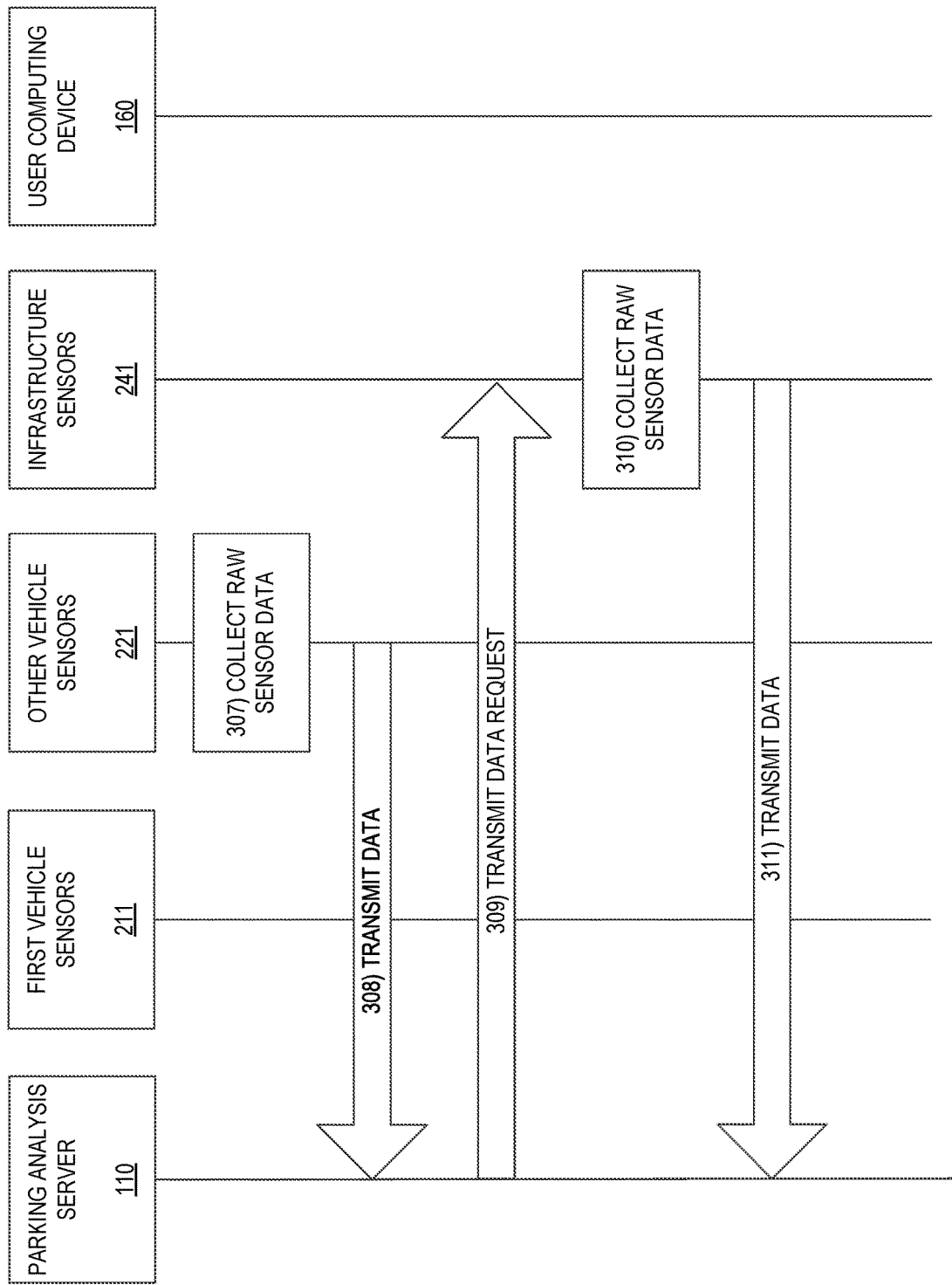
Figure 3C:
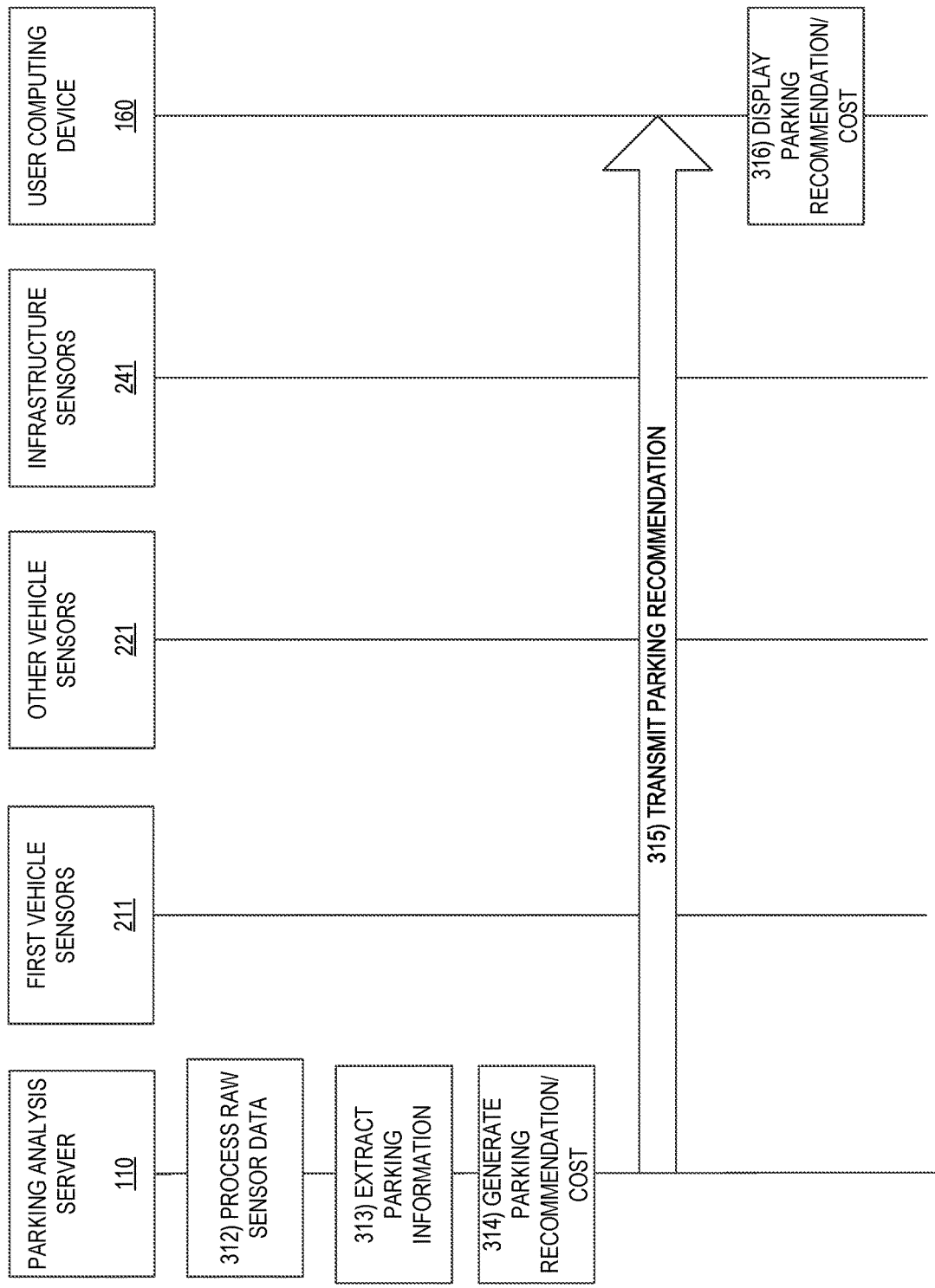

FIGS. 3A-3C illustrate one example event sequence for receiving and analyzing sensor data in order to evaluate parking locations and generate a parking location recommendation in accordance with one or more aspects described herein. The sequence illustrated in FIGS. 3A-3C is merely one example sequence and various other events may be included, or events shown may be omitted, without departing from the invention.

With reference to FIG. 3A, in step 301, a parking recommendation request may be received. The parking recommendation request may be received by the parking analysis server 110 (or 250) and from the user computing device 160. In some arrangements, the parking recommendation request may be received from a mobile computing device within a vehicle for which parking is being requested, such as mobile computing device 215 in FIG. 2.

The request for the parking recommendation may activate the parking analysis server 110 and parking analysis may be initiated in step 302. Initiating the parking analysis may be based on the request for parking recommendation or activation of the parking analysis server and may include transmitting a request for data to a first vehicle 210 for which parking is being requested in step 303. In step 304, raw sensor data (e.g., signals) from the first vehicle 210 may be collected and, in step 305, the raw sensor data may be transmitted from the first vehicle 210 to the parking analysis server 110. Some or all of these steps may be performed in real-time. In some examples, the raw sensor data collected may include location information of the vehicle, historical parking information (e.g., locations, durations, etc.), operational data associated with the vehicle, maintenance, data, and the like.

In step 306, the parking analysis server 110 may transmit a request for data from sensors 221 in one or more other vehicles. The other vehicles may be autonomous, semi-autonomous, or non-autonomous vehicles. In some examples, the request in step 306 may be performed simultaneously (or nearly simultaneously) with the request in step 303.

With reference to FIG. 3B, in step 307, raw sensor data (e.g., signals) may be collected by the sensors 211. In step 308, the raw sensor data may be transmitted from the sensors 221 to the parking analysis server 110. Some or all of these steps may be performed in real-time. In some examples, the raw sensor data collected may include current location information of the one or more vehicles, whether the vehicles are parked or in transit, historical parking information, operational data, and the like.

In step 309, the parking analysis server 110 may transmit a request for data to one or more structures or other non-vehicle devices (such as infrastructure 240 in FIG. 2). In some examples, the request may be transmitted simultaneously with one or more of request 303 and/or request 306. The request may be transmitted to sensors 241 within the structure or device and, in step 310, raw sensor data may be collected by the sensors 241. In some examples, the data collected may include data related to parking availability, light levels in or around the structure or device, other environmental conditions, and the like. In step 311, the raw sensor data may be transmitted to the parking analysis server 110. One of more of the steps may be performed in real-time.

With reference to FIG. 3C, in step 312, the received raw sensor data may be processed by the parking analysis server 110. For instance, the raw data may be analyzed to determine parking history, parking preferences, driving behaviors, operational performance of the first vehicle, and the like. Additionally or alternatively, the raw data may be processed to determine environmental conditions in one or more areas (e.g., based on data from sensors 221 or 241), time of day, daylight levels, and the like.

In step 313, parking information may be extracted from one or more other sources. For instance, a parking database (e.g., 114 in FIG. 1) may store information associated with crime rates in various geographic areas (e.g., by zip code, city, town, or the like), historical accident information associated with one or more parking locations, as well as other parking information that may be used to generate a parking recommendation. The information may be extracted by submitting a query (e.g., from parking module 113 to parking database 114) requesting particular information (e.g., information for a particular location, type of vehicle, or the like).

In step 314, a parking recommendation may be generated. For instance, the parking analysis server 110 may analyze the data received and may generate a recommended parking location for the first vehicle. The recommended parking location may be based on the location of the first vehicle, time of day, risks associated with parking in different areas (e.g., based on crime rates, accident histories, etc.), as well as other data.

In some examples, the parking recommendation may be generated based on one or more preferences provided by a user. For instance, a user associated with a vehicle, such as the first vehicle, may pre-store one or more parking preferences, such as in parking database 114. The pre-stored preferences may include, for instance, a number of blocks the user is willing to walk from a parking location to a destination (e.g., ½ block, 4 blocks, or the like). In some examples, the preferences may be modified based on environmental conditions determined from the sensor data. For instance, a user may have a pre-stored preference to walk up to five blocks from the parking location to the destination. However, if sensor data indicates that it is raining, snowing, below a certain temperature, or the like, the system may automatically modify the preference to a fewer number of blocks (e.g., 1 block, 2 blocks, or the like).

In another example, the parking analysis server 110 may access a calendar of the user (e.g., via the mobile device of the user) to determine whether the user is running late for an appointment in the calendar. If so, the system may automatically modify preferences to include a fewer number of blocks or shorter walk to the destination. In some examples, a user may have an option to opt out of automatic modification of one or more preferences.

In another example, a user may pre-store one or more preferences directed to a type of vehicle next to which the user would prefer to park the first vehicle. For instance, a user may desire to park next to newer vehicles in thinking that drivers of newer vehicles also want to avoid door dings or other damage to the vehicle. Accordingly, the user may enter a preference to desire to park next to vehicles that have a model year within a threshold number of years of the current year. Accordingly, when generating the parking recommendation, the parking analysis server 110 may request data from vehicles parked in a lot, parking garage, or the like, that have the desired model year generate a recommendation for the first vehicle to park in that location (e.g., based on availability, number of vehicles meeting criteria, and the like). Additionally or alternatively, the parking analysis server 110 may request data from a plurality of vehicles and may evaluate only data received from vehicles having a model year meeting the threshold.

Generating the parking recommendation in step 314 may further include determining a cost associated with parking in the recommended location. For instance, if the recommended parking location is a private lot, there may be a cost associated with parking. If so, the cost may be determined. In some examples, a user may pre-store a preference setting a limit on cost to park a vehicle. Accordingly, in generating the parking recommendation for those examples, the system may take into account cost of parking in various locations when generating a recommendation.

In some examples, for users having usage-based insurance (e.g., insurance in which the user has a balance of funds or other credits that are decreased as the user operates the vehicle based on various factors (e.g., risk, time of day, driving behaviors, driving record, and the like)) the parking analysis server 110 may also generate an insurance cost to park the first vehicle in the recommended parking location. For instance, risk associated with parking in the recommended location may be determined and a cost to park there (e.g., total cost, cost per hour, cost per day, or the like) may be determined by the system. Accordingly, the user may be informed of associated cost and, if desired, may request or select a different recommended parking location to reduce costs. In some examples, the risk may be based on a variety of factors, such as historical incidents of the location, historical incidents of the first vehicle, incidents around a particular parking spot, historical claim data, number of cars in the location (e.g., parked or in transit), types of vehicles, size of vehicles in the area, prior damage to one or more vehicles, presence of pedestrians, time of day, proximity to destination, whether a significant event is occurring nearby that day, crime in the area, social media posts about the area, lighting levels, whether the parking location is an enclosed garage, surface lot, street parking location, proximity to streets and/or intersections, police activity in the area over time, topography, and the like.

Upon generating the parking recommendation, the system may transmit the recommendation (as well as any associated costs) to a user computing device 160. The user computing device 160 may be a mobile device of the user associated with the first vehicle, may be an on-board vehicle computing device, or the like. The parking analysis server 110 may cause a notification to be displayed on a display of the user computing device 160 in step 316. The notification may include the location of the recommended parking location (e.g., coordinate information, address, or the like), as well as any costs associated with parking in the recommended location.

FIGS. 4A-4E illustrate one example event sequence for recommending and/or managing parking of autonomous vehicles in accordance with one or more aspects described herein. The sequence illustrated in FIGS. 4A-4E is merely one example sequence and various other events may be included, or events shown may be omitted, without departing from the invention.

Figure 4A:
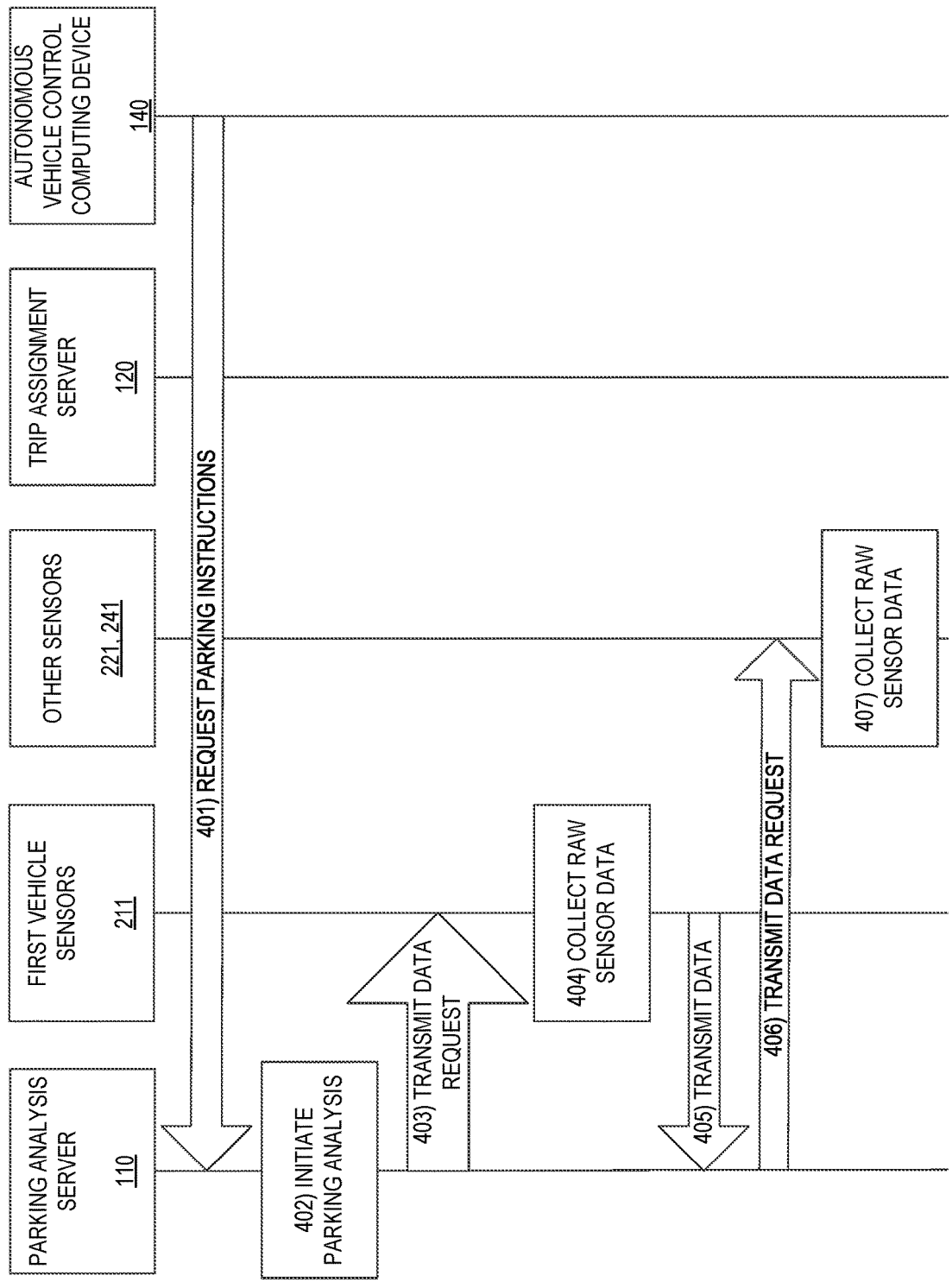
FIGS. 4A-4E depict an illustrative event sequence for recommending and/or managing parking associated with autonomous vehicles according to one or more aspects described herein.

With reference to FIG. 4A, in step 401, a request for parking instructions may be transmitted from an autonomous vehicle (e.g., from an autonomous vehicle control computing device 140) to a parking analysis server 110. In response to the request, the parking analysis server 110 may be activated and, in step 402, parking analysis may be initiated. For instance, the request for instructions may cause activation of the parking analysis server 110 and may initiate the parking analysis. In other examples, step 401 may be omitted and the parking analysis server 110 may monitor (e.g., continuously monitor) locations of autonomous vehicles, proximity to designated destinations, and the like, and the parking analysis may be initiated upon determining that an autonomous vehicle is approaching a destination.

In step 403, a request for data may be transmitted from the parking analysis server 110 to a first vehicle requesting parking. For instance, a request for data may be transmitted to one or more sensors 211 within the first vehicle. In step 404, the sensors 211 may collect raw data (e.g., signals) and, in step 405, the raw data may be transmitted to the parking analysis server. In some examples, the data collected may be similar to various types of data discussed herein with respect to other data collection processes. One or more of the steps may be performed in real-time.

In step 406, the parking analysis server 110 may transmit a request for data to sensors in in one or more other vehicles or devices/structures. For instance, a request for data may be transmitted to sensors 221 in one or more other vehicles, to sensors 241 in infrastructure 240, and the like. In some arrangements, data from only the plurality of other vehicles and not additional devices or structures may be requested. In other arrangements, only data from one or more structures or non-vehicle devices may be requested while data from one or more other vehicles might not be requested. The request may be made in real-time and may be performed simultaneously, or nearly simultaneously with request 403.

Figure 4B:
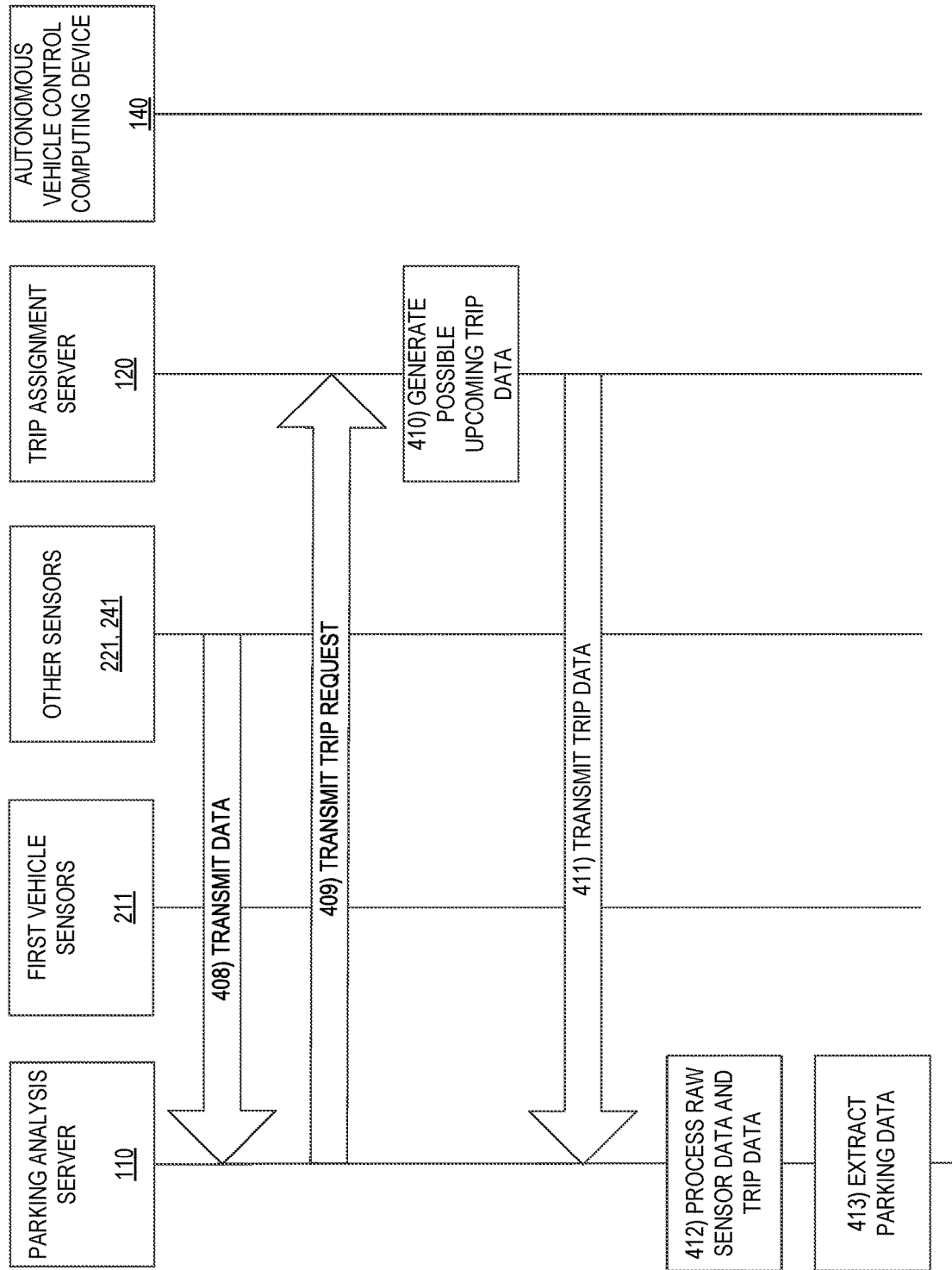

In step 407, raw sensor data may be collected by one or more of sensors 221 and 241. With reference to FIG. 4B, in step 408, the collected data may be transmitted to the parking analysis server 110. The data collected may be data similar to other data collection processes described herein.

In step 409, a future trip may be requested. For instance, the parking analysis server 110 may transmit a request to the trip assignment server 120 to determine (or estimate) a destination, location, or the like, of a future trip of the first vehicle. As discussed above, future trips may be determined based on historical data, data retrieved from an electronic calendar of a user, planned or pre-scheduled trips, or the like. Accordingly, information related to a destination or timing associated with a future trip may be useful in generating a parking recommendation.

In step 410, a potential future trip may be generated by the trip assignment server 120. For instance, if a future (e.g., a next) trip has been pre-scheduled, the trip assignment server 120 may retrieve known future trip data for the first vehicle from the trip assignment database 124 (e.g., by querying the database). In another example, the trip assignment server 120 may generate a projected future trip by analyzing data associated with historical trips associated with the first vehicle, historical trips associated with a user of the first vehicle, upcoming calendar appointments, and the like.

In step 411, the generating upcoming trip data may be transmitted to the parking analysis server 110. The upcoming trip data may include GPS or other location information associated with the vehicle, destination, or starting location, address information, or the like.

In step 412, the received raw sensor data, as well as the upcoming trip data, may be analyzed by the parking analysis server 110. In step 413, additional data may be extracted from a database, such as parking analysis database 114. As discussed herein, the additional data may include historical accident information associated with a potential parking location, crime statistics for the area, environmental conditions in the area, lighting, and the like.

Figure 4C:
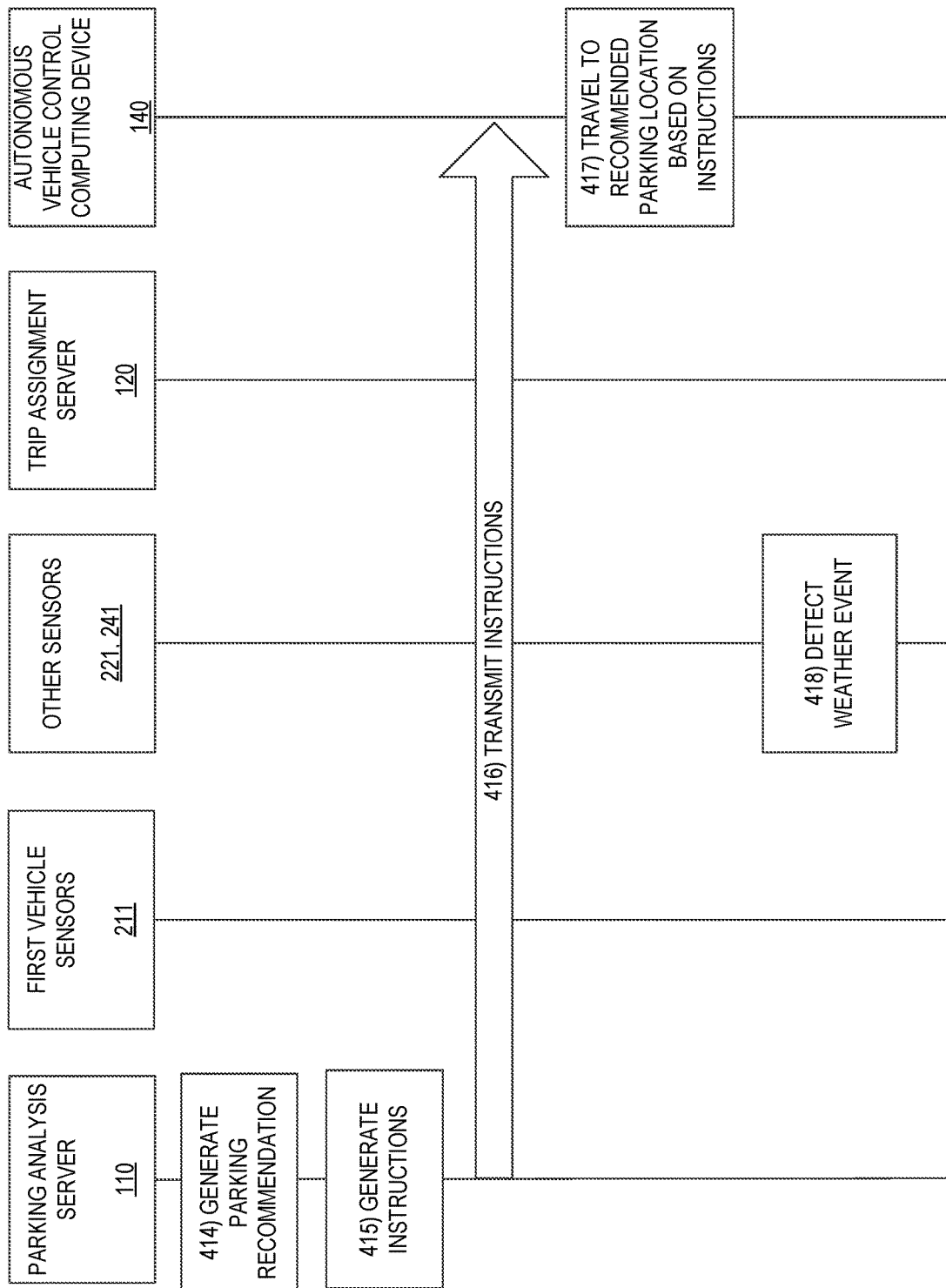

With reference to FIG. 4C, a recommended parking location may be generated in step 414.

In step 415, instructions to instruct the autonomous vehicle to travel to the recommended parking location may be generated and, in step 416, the instructions may be transmitted to the first vehicle via the autonomous vehicle control computing device 140. Transmission of the instructions may cause the first vehicle to travel to the recommended parking location in step 417.

In some arrangements, additional aspects may be evaluated to either generate a parking recommendation or modify an existing parking recommendation. Although these additional aspects will be described with reference to FIG. 4 as being performed as modifications of a generated parking recommendation, the aspects may be used to generate an initial parking recommendation without departing from the invention.

For instance, in step 418, a potential weather event may be detected. For instance, if a hail storm, thunderstorm, or other potential inclement weather is approaching (e.g., weather that may damage a vehicle or cause harm), one or more sensors in the first vehicle may detect the approaching weather event (e.g., from one or more sensors monitoring weather, from barometric pressure sensors, from other vehicles transmitting information via V2V communications, or the like).

Figure 4D:
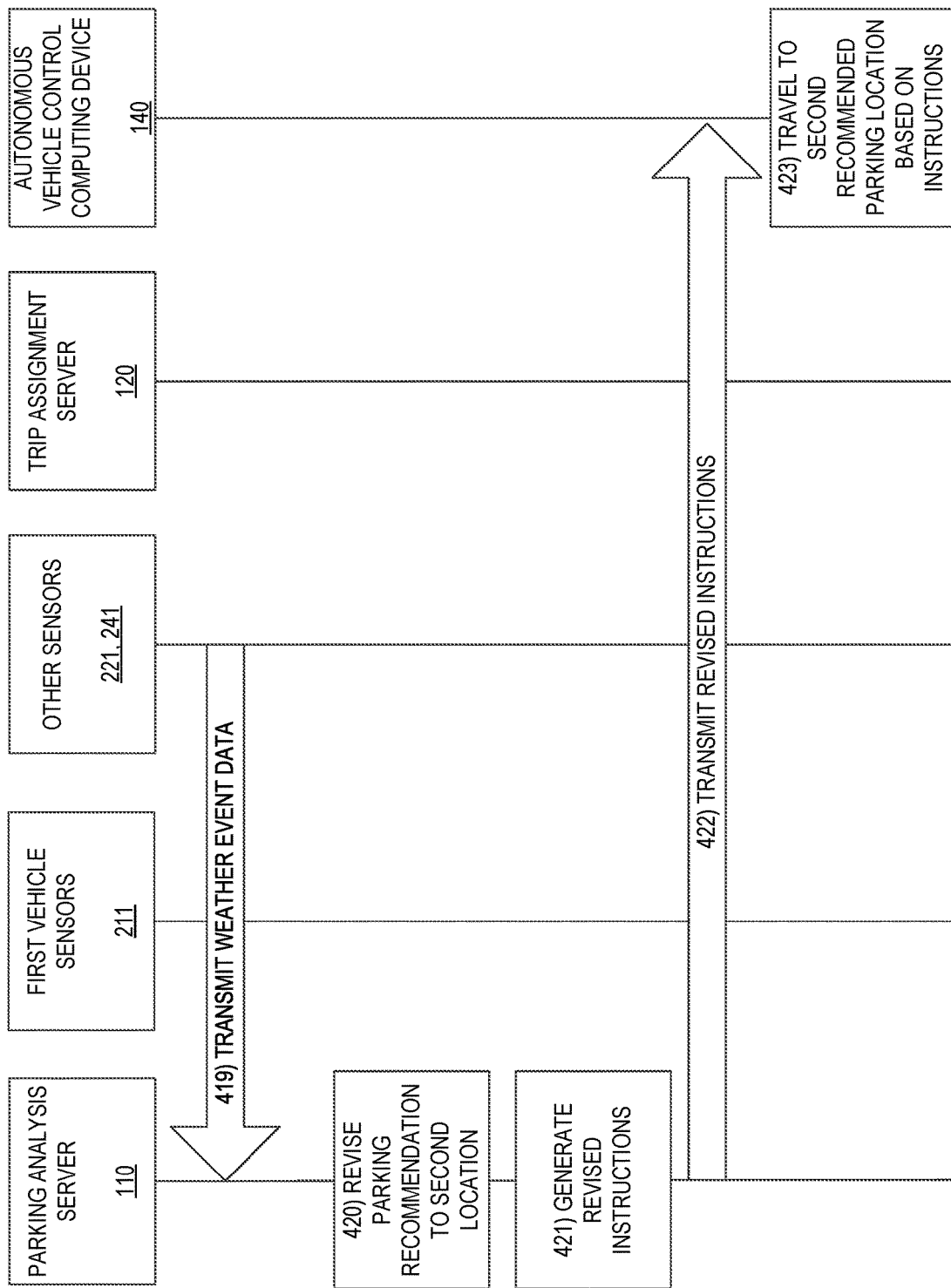

With reference to FIG. 4D, the weather event may be transmitted to the parking analysis server 110 in step 419. In step 420, the parking analysis server 110 may evaluate the weather event data and may revise the recommended parking location to a second location different from the first recommended parking location. For instance, if a hail storm is approaching, the parking analysis server 110 may revise the parking recommendation to a parking location that is closer to the current location of the first vehicle and/or includes a covered area to avoid damage to the first vehicle.

In step 421, revised instructions for the first vehicle may be generated and the instructions may be transmitted to the first vehicle via the autonomous vehicle control computing device 140 in step 422. Transmission of the revised instructions may cause the first vehicle to travel to the revised parking location in step 423.

Figure 4E:
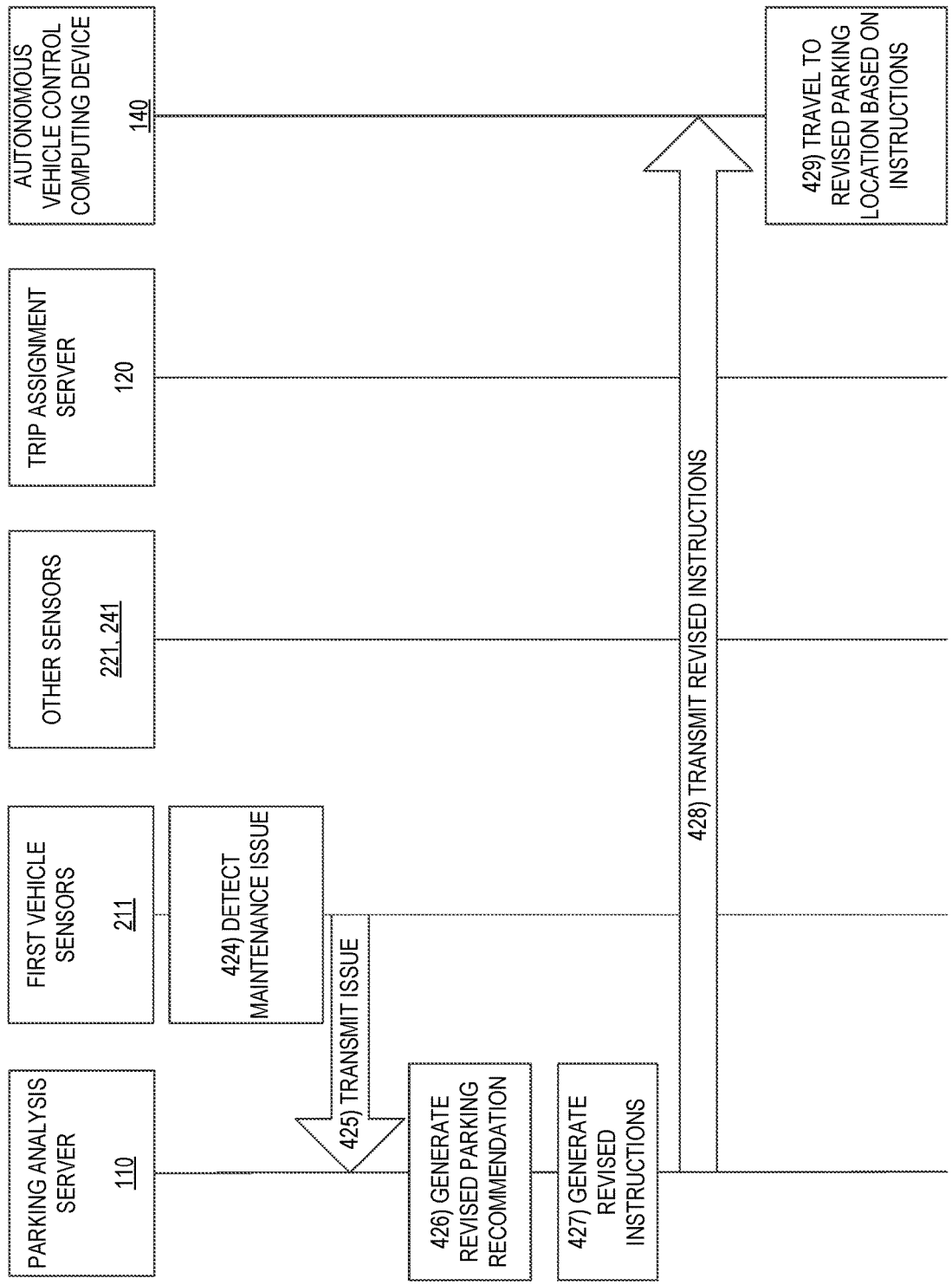

In another example, with reference to FIG. 4E, a maintenance issue may be detected at the first vehicle in step 424. The maintenance issue may be a routine maintenance issue (e.g., oil change, charge, fuel, brake replacement, tire rotation or replacement, or the like) or may be maintenance related to a failure or issue with one or more systems. The maintenance issue may be detected by one or more sensors 211 associated with the first vehicle. In step 425, the detected maintenance issue may be transmitted to the parking analysis server 110.

In step 426, the parking analysis server may evaluate the maintenance information and may revise a parking recommendation based on the maintenance information. For instance, the parking analysis system may identify one or more potential parking locations at which the maintenance issue can be addressed (e.g., repair can be provided, fuel may be obtained, or the like). In step 427, revised instructions to travel to the revised parking location may be generated and, in step 428, may be transmitted to the first vehicle via the autonomous vehicle control computing device 140. Transmission of the instructions may cause the first vehicle to travel to the revised location in step 429.

Figure 5A:
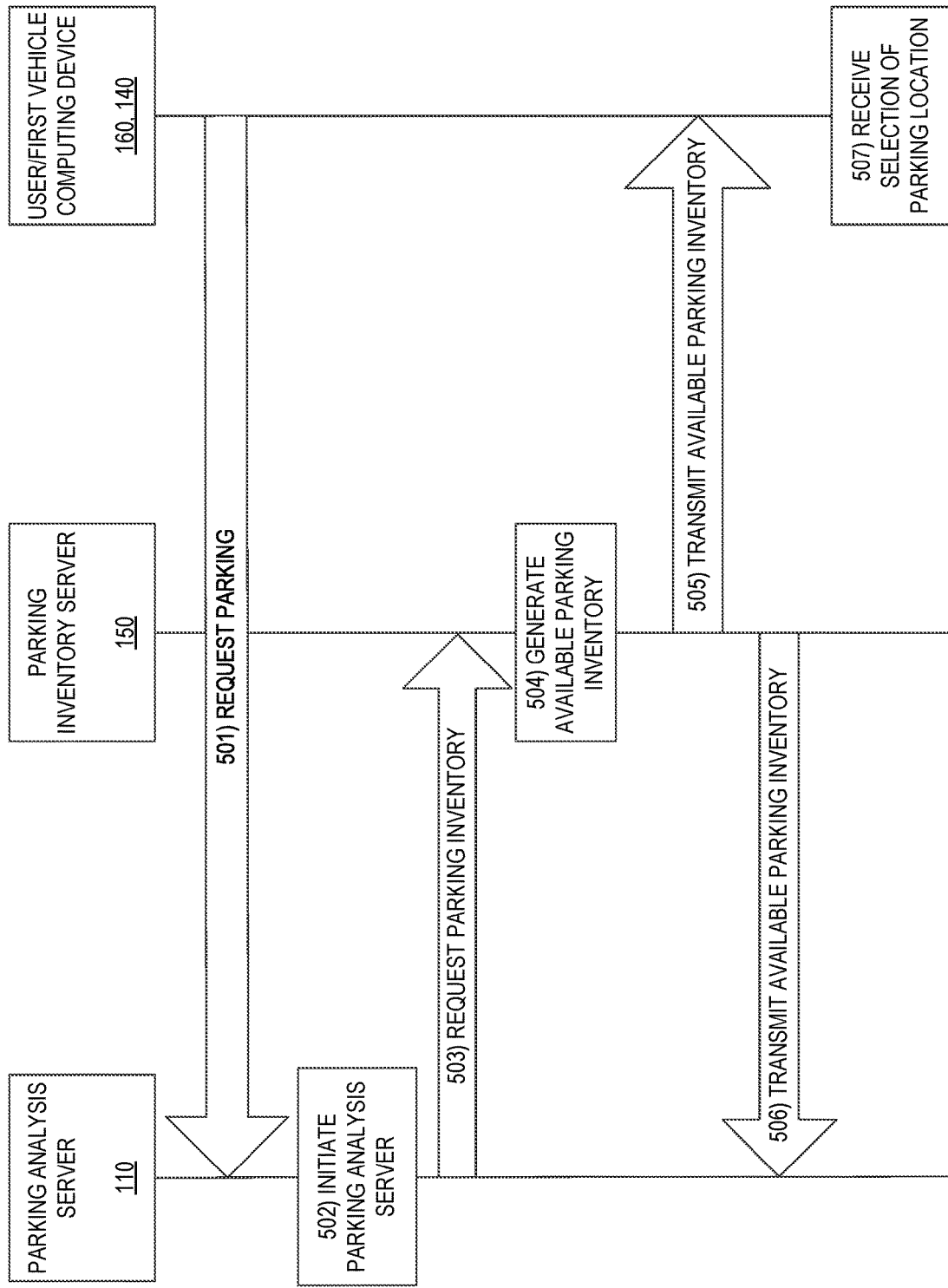
FIGS. 5A-5C depict an illustrative event sequence for evaluating an inventory of parking locations, generating a parking recommendation and facilitating payment of costs associated with parking in accordance with one or more aspects described herein.
Figure 5B:
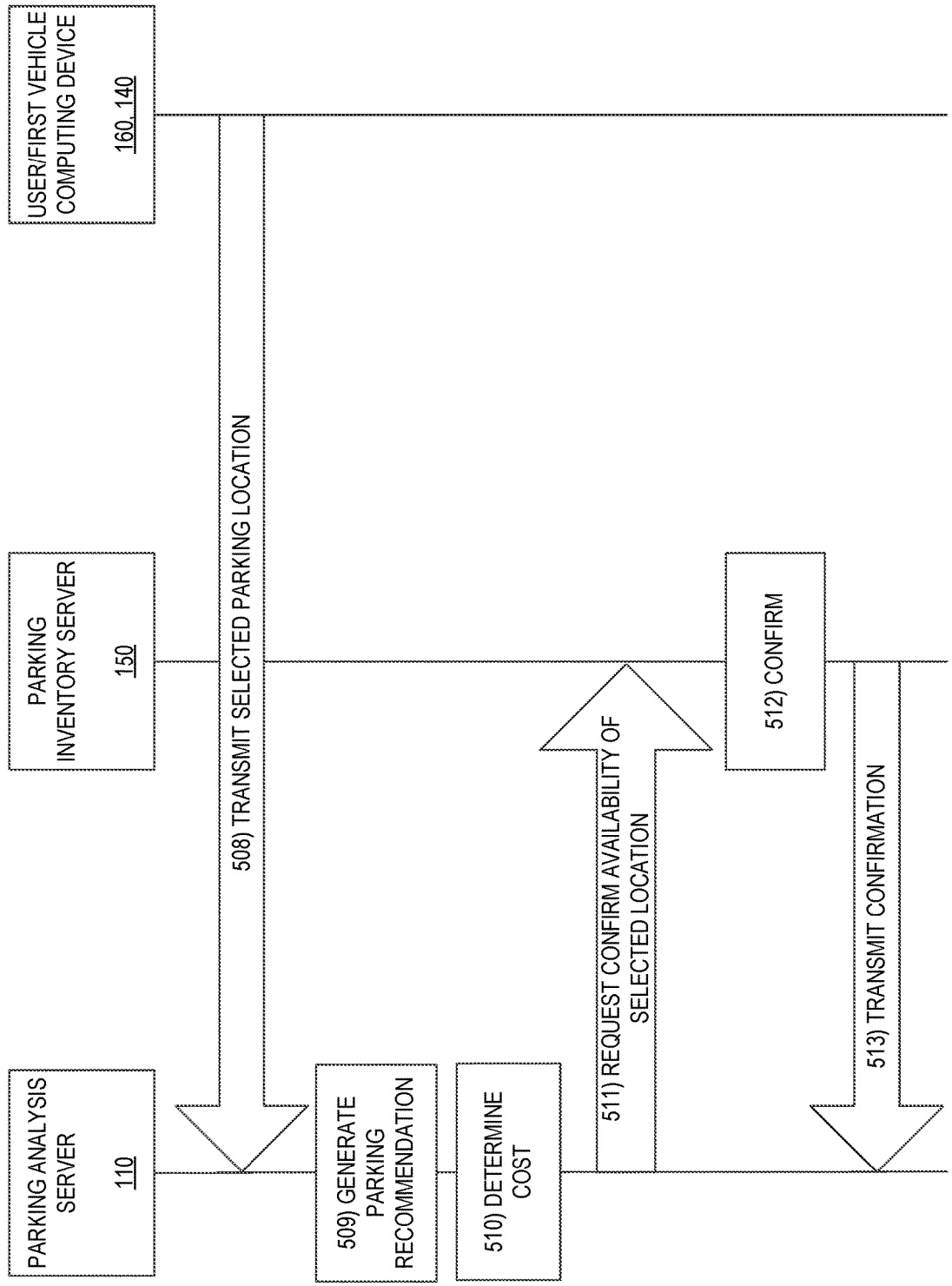
Figure 5C:
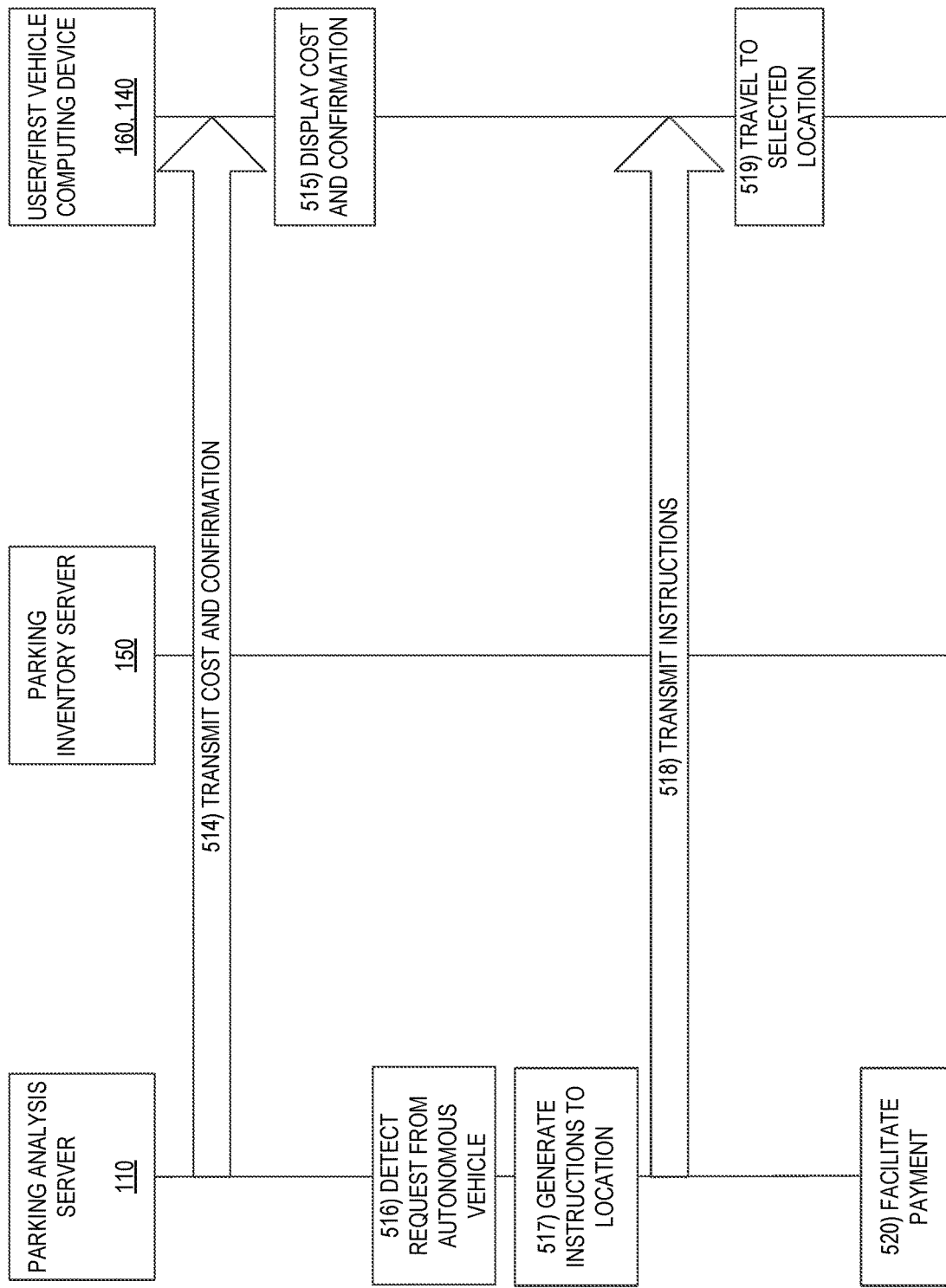

FIGS. 5A-5C illustrate one example event sequence for evaluating an inventory of parking locations, generating a parking recommendation and facilitating payment of costs associated with parking in accordance with one or more aspects described herein. The sequence illustrated in FIGS. 5A-5C is merely one example sequence and various other events may be included, or events shown may be omitted, without departing from the invention.

One or more steps described herein may be performed via an application executing on one or more computing devices. For instance, as discussed below, users may request parking analysis, parking inventory, make selections, and the like, via an application executing on, for instance, a user computing device 160.

With reference to FIG. 5A, in step 501, a request for parking may be received. The request may be received from a user computing device, such as device 160 or from autonomous vehicle control computing device 140 in the case of autonomous vehicles. Upon receiving the request, the parking analysis server 110 may be activated and parking analysis may be initiated in step 502. In step 503, the parking analysis server 110 may request updated parking inventory information from a parking inventory server 150. The parking inventory server 150 may receive parking locations (e.g., from a plurality of users) that are available for use. In some examples, the parking locations may be privately owned (e.g., in a lot, neighborhood with permit based parking, in a private garage, or the like). In some examples, users may offer the available parking location to the parking inventory in exchange for payment of a fee by the user who parks in the location.

In step 504, the currently available parking inventory may be generated. In some examples, the currently availably parking inventory may include one or more parking locations that are scheduled to become available. For instance, a user may indicate that his or her parking space will become available within one hour, within ten minutes, or the like. These locations may, in some examples, be included in the inventory and/or provided for consideration.

In step 505, the available parking inventory may be transmitted to the user computing device 160. In some arrangements in which the request for parking is received from an autonomous vehicle, the parking inventory may be transmitted to the parking analysis server 110 in step 506, for evaluation. In step 507, a user may select a desired parking location.

With reference to FIG. 5B, the parking location selected by the user in step 507 may be transmitted to the parking analysis server 110 in step 508. In step 509, if the parking request was initiated by an autonomous vehicle and the parking inventory was transmitted to the parking analysis server 110 for evaluation, the parking analysis server 110 may generate a parking recommendation in step 509. Generating the parking recommendation may be performed using similar processes, data, and the like, as described herein with respect to generating parking recommendations.

In step 510, the parking analysis server 110 may determine a cost associated with the selected/recommended parking location. The cost may be based on a charge associated with the owner or user who posted the parking location to the parking inventory. In step 511, a request to confirm availability of the selected/recommended location may be transmitted from the parking analysis server 110 to the parking inventory server 150. In step 512, the availability of the selected/recommended location may be confirmed by the parking inventory server 150 and the confirmation may be transmitted to the parking analysis server 110 in step 513.

With reference to FIG. 5C, in step 514, the cost and confirmation of availability of the location may be transmitted to the user computing device 160. In step 515, the parking analysis server 110 may cause the cost and confirmation to be displayed on the user computing device 160.

Alternatively, if the request for parking was received from an autonomous vehicle, the parking analysis system may detect that in step 516 and, in step 517, may generate instructions to travel to the recommended parking location. In step 518, the generated instructions may be transmitted to the autonomous vehicle via the autonomous vehicle control computing device 140. Transmission of the instructions may cause the autonomous vehicle to travel to the recommended parking location in step 519.

In step 520, payment associated with using the selected/recommended parking location may be facilitated. For instance, the parking analysis server 110 may be configured to store payment information associated with one or more users requesting parking (e.g., credit or debit card numbers, pre-paid card numbers, or the like) and may facilitate payment to the user associated with the parking location (e.g., via an online payment system, via a parking application executing on one or more devices, or the like). Accordingly, in at least some examples, no further action is required by the user requesting parking. Instead, a request may be made, a selection or recommendation may be made and the vehicle may proceed to park in the location (e.g., without addressing payment information at the time of parking).

Facilitating payment associated with parking may be similarly facilitated by the parking analysis server 110 in various other arrangements described herein as well.

Figure 6:
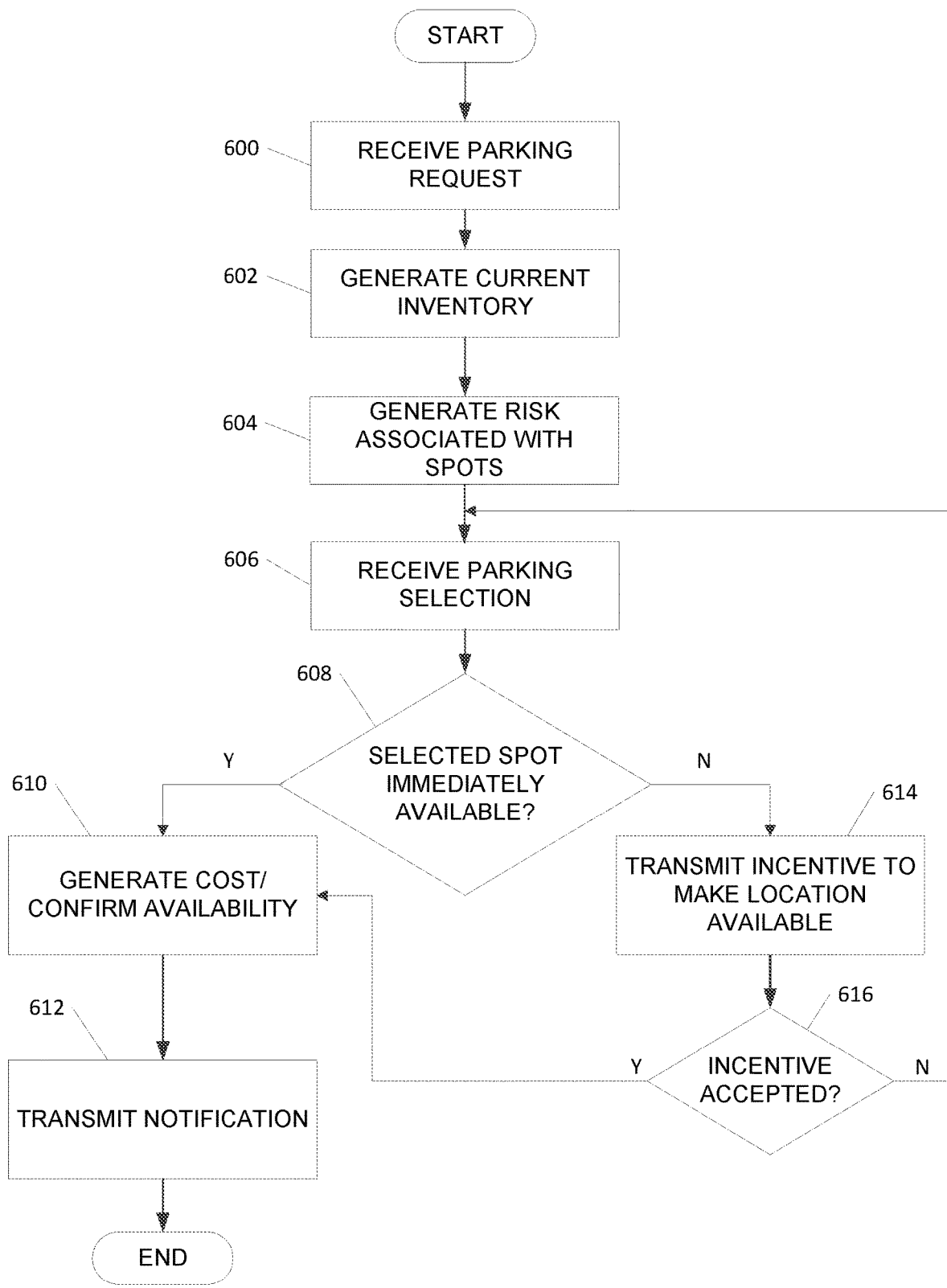
FIG. 6 illustrates one example flow chart illustrating an example method of efficiently managing parking according to one or more aspects described herein.

FIG. 6 illustrates one example process for efficiently managing parking according to one or more aspects described herein. The steps and processes described with respect to FIG. 6 may be performed by one or more devices, such as those described herein with respect to FIGS. 1 and 2.

In step 600, a request for parking may be received. The request may be similar to other requests for parking described herein. In step 602, a current parking inventory may be generated (such as by parking inventory server 150). The current parking inventory may include parking locations having immediate availability, as well as parking locations having upcoming availability (e.g., will become available in 10 minutes, 30 minutes, 2 hours, or the like). In some examples, availability of a parking location may be received from a user associated with the parking location. Additionally or alternatively, the availability of the parking location (e.g., when the current vehicle may be vacating the location) may be transmitted from the vehicle currently parked in the location to the vehicle requesting parking, such as via V2V communications. In some examples, in step 604, a risk associated with each spot in the inventory may be determined. For instance, risk associated with parking in the locations within the inventory may be determined by the system. In some examples, the risk may be based on a variety of factors, such as historical incidents of the location, historical incidents of the first vehicle, incidents around a particular parking spot, historical claim data, number of cars in the location (e.g., parked or in transit), types of vehicles, size of vehicles in the area, prior damage to one or more vehicles, presence of pedestrians, time of day, proximity to destination, whether a significant event is occurring nearby that day, crime in the area, social media posts about the area, lighting levels, whether the parking location is an enclosed garage, surface lot, street parking location, proximity to streets and/or intersections, police activity in the area over time, topography, and the like.

In step 606, a parking location selection may be received. The parking location selection may include selection of a parking location from the parking inventory. In some examples, the selection of a location may be based on the determined risk, one or more user preferences, availability, and the like.

In step 608, a determination is made as to whether the selected spot is immediately available or has upcoming availability. If, in step 606, the spot is immediately available, the cost associated with the spot may be generated and availability may be confirmed in step 610. A notification may then be transmitted to a user device in step 612 indicating the cost and confirming availability.

If, in step 608, the parking location is not immediately available, an incentive to make the parking location immediately available may be transmitted to an owner or user associated with the parking location in step 614. For instance, if the spot is going to become available in 10 minutes, the system may transmit an offer or incentive to the user (e.g., via a mobile device of the user, application executing on a device of the user, SMS, or the like) to make the parking location available immediately rather than in 10 minutes. Accordingly, if the user associated with the spot is able to make the spot available early, the incentive might motivate the user to do so. An incentive may be a financial incentive (e.g., payment of funds directed to the user associated with the parking location), discount, or other type of incentive.

In step 616, a determination is made as to whether the incentive was accepted (e.g., whether user input accepting the offered incentive was received). If so, the process may proceed to step 610. If not, the process may return to step 606 where another parking selection may be received. In some examples, if the incentive is not accepted, a notification may be generated and transmitted to the first vehicle or user associated with the first vehicle requesting selection of another location.

FIGS. 7-10 illustrate various user interfaces that may be used in accordance with one or more aspects described herein. The user interfaces are merely some example user interfaces and various other user interfaces, display elements, and the like, may be used without departing from the invention. The interfaces may be displayed on one or more devices, such as a user computing device (e.g., mobile device, smart phone, tablet, or the like), an on-board vehicle computing device having a display in the vehicle, and the like.

FIG. 7 illustrates one example user interface 700 in which a user may elect one or more parking preferences. For instance, a user may select a maximum distance he or she is willing to walk from the parking location to his or her destination. In some examples, the distance may be expressed in blocks, feet, yards, miles, meters, or the like. In other examples, the distance may be represented as an amount of time walking (e.g., not more than a 10 minute walk). In such arrangements, the system may adopt an estimated walking pace (e.g., 15 minutes per mile, 17 minutes per mile, 20 minutes per mile, or the like) and may use that figure in making parking recommendations.

The user interface 700 may also include a field in which a user may specify a threshold number of model years for vehicles next to which the user prefers to park. For instance, the user has selected a parking preference of vehicles less than 2 years old. Accordingly, the system will consider this preference when making recommendations.

Further, as discussed herein, the system may automatically modify one or more preferences based on other data (e.g., external conditions such as weather data, and the like). Accordingly, interface 700 further includes an option to turn the automatic modify feature "on" (e.g., the system may automatically modify preferences) or "off" the system may not automatically modify preferences.

FIG. 8 illustrates one example user interface 800 providing a parking recommendation.

The interface includes the address of the recommended parking location, as well as a cost associated with the recommended parking location.

Figure 9:

FIG. 9 illustrates one example user interface 900 listing available parking as generated by, for example, a parking inventory server. The user interface 900 includes spots that are immediately available as well as one spot that is schedule to become available. As discussed herein, the system may transmit an offer or incentive to a user associated with the spot with upcoming availability in an effort to move up the time of availability of the spot. In some examples, the incentive may be selected by the user and pre-stored (e.g., the user may select an incentive to offer in these situations). Additionally or alternatively, the user may input an incentive to offer (e.g., into a parking application executing on a mobile device of the user) and the incentive may be transmitted to the user associated with the parking location.

Figure 10:
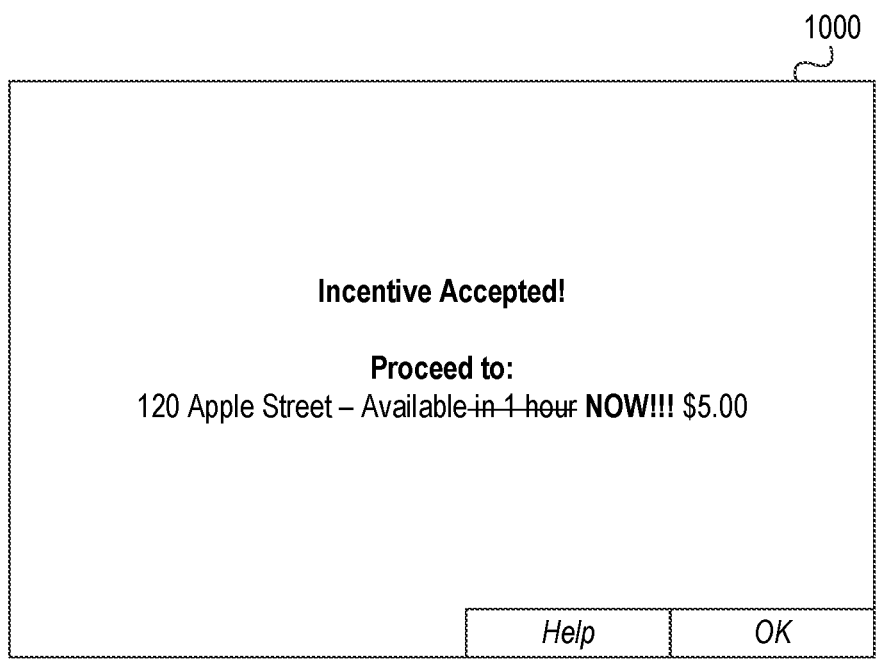

FIG. 10 illustrates one example user interface 1000 providing a notification that the user's incentive has been accepted. The spot that was previously unavailable is now immediately available and has an increased cost reflecting, in this example, a cost associated with the incentive.

As discussed herein, one or more functions, processes, operations, or the like, may be performed in real-time or near real-time in order to efficiently manage parking arrangements and quickly provide parking recommendations. Additionally or alternatively, one or more processes, functions, operations, or the like, (e.g., requests for data, transmission of data, processing data, and the like) may be performed simultaneously or nearly simultaneously in order to efficiently generate parking recommendations.

As described herein, various aspects and arrangements may be used with autonomous vehicles, as well as semi-autonomous and non-autonomous vehicles. When arrangements are used with autonomous vehicles, efficient parking in various locations may be provided to multiple parties. For instance, autonomous vehicles may be parked more closely than semi-autonomous or non-autonomous vehicles because a driver does not need to enter the vehicle (e.g., open a door) prior to moving the vehicle. Additionally or alternatively, autonomous vehicles may be double parked or otherwise block other vehicles because the autonomous vehicles may be easily moved to permit access to vehicles blocked in. This may aid in parking more vehicles in a given area and may improve efficiency associated with managing parking of all types of vehicles.

In some aspects, vehicles may emit a signal indicating that other vehicles (e.g., autonomous, semi-autonomous or non-autonomous) either should or should not park next to or near the vehicle or whether a parking location is available next to or in proximity to the vehicle. In some examples, the signal may be emitted via V2V or V2I communications. This information may further be used to identify available parking locations and efficiently manage parking (e.g., avoid sending multiple vehicles a recommendation to park in the same parking location).

Efficiently managing parking may be useful in fleet-type operations, such as ride sharing services. In particular, autonomous vehicles used for ride sharing services may be efficiently instructed to park in various locations for a predetermined amount of time.

In some arrangements, as discussed herein, one or more maintenance aspects may be addressed while a vehicle is in a parking location. For instance, an autonomous vehicle may obtain software updates or other maintenance while parked. In other examples, the autonomous vehicle may be able to fuel itself by connecting itself to a charging device or by receiving charging current through other means (e.g., via air). This may aid in efficiently servicing vehicles during given downtime, rather than scheduling additional downtime to perform maintenance.

Some aspects of the arrangements described herein may permit a vehicle to collect data about another vehicle involved in an incident (e.g., accident). For instance, if a second vehicle contacts a first vehicle, the first vehicle may use one or more sensors, cameras, or the like, to detect information about the second vehicle (e.g., color, make, model, license plate number, vehicle identification number (VIN), and the like). This information may be used to process insurance claims and ensure that accurate records of the incident are maintained.

Further, in some examples, the data collected by one or more vehicles may identify one or more issues in an environment surrounding a vehicle and may present the issue to a user in a natural language manner. For instance, one or more cameras may detect broken glass around a vehicle and may then transmit or display a notification of the broken glass. Similarly, one or more vehicle sensors may detect that less light is available in a given location than is normally available and may determine that a streetlight is out. Accordingly, a notification may be transmitted to the user indicating that the streetlight is out.

FIG. 11 illustrates a block diagram of a computing device 1101 in parking analysis communication system 1100 that may be used according to one or more illustrative embodiments of the disclosure. The parking analysis device 1101 may have a processor 1103 for controlling overall operation of the device 1101 and its associated components, including RAM 1105, ROM 1107, input/output module 1109, and memory 1115. The computing device 1101, along with one or more additional devices (e.g., terminals 1141, 1151) may correspond to any of multiple systems or devices, such as a parking analysis computing devices or systems, configured as described herein for transmitting and receiving vehicle-to-vehicle (V2V) communications, vehicle-to-infrastructure (V2I) communications, analyzing parking data, analyzing driving data and vehicle operation data, generating parking recommendations, generating instructions for an autonomous vehicle to travel to a parking location, and the like.

Input/Output (I/O) 1109 may include a microphone, keypad, touch screen, and/or stylus through which a user of the computing device 1101 may provide input, and may also include one or more of a speaker for providing audio output and a video display device for providing textual, audiovisual and/or graphical output. Software may be stored within memory 1115 and/or storage to provide instructions to processor 1103 for enabling device 1101 to perform various functions. For example, memory 1115 may store software used by the device 1101, such as an operating system 1117, application programs 1119, and an associated internal database 1121. Processor 1103 and its associated components may allow the parking analysis system 1101 to execute a series of computer-readable instructions to transmit or receive vehicle driving data, analyze driving data and identify driving behaviors, and calculate driver scores.

The parking analysis computing device 1101 may operate in a networked environment 1100 supporting connections to one or more remote computers, such as terminals/devices 1141 and 1151. Parking analysis computing device 1101, and related terminals/devices 1141 and 1151, may include devices installed in vehicles, mobile devices that may travel within vehicles, or devices outside of vehicles that are configured to receive and process vehicle, parking, and driving data. Thus, the parking analysis computing device 1101 and terminals/devices 1141 and 1151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the parking analysis computing device 1101. The network connections depicted in FIG. 11 include a local area network (LAN) 1125 and a wide area network (WAN) 1129, and a wireless telecommunications network 1133, but may also include other networks. When used in a LAN networking environment, the parking analysis computing device 1101 may be connected to the LAN 1125 through a network interface or adapter 1123. When used in a WAN networking environment, the device 1101 may include a modem 1127 or other means for establishing communications over the WAN 1129, such as network 1131 (e.g., the Internet). When used in a wireless telecommunications network 1133, the device 1101 may include one or more transceivers, digital signal processors, and additional circuitry and software for communicating with wireless computing devices 1141 (e.g., mobile phones, short-range vehicle communication systems, vehicle telematics devices) via one or more network devices 1135 (e.g., base transceiver stations) in the wireless network 1133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 1119 used by the parking analysis computing device 1101 may include computer executable instructions (e.g., parking analysis, parking recommendation generation, etc.) for transmitting and receiving vehicle driving and operational data, parking data, sensor data from infrastructure, generating parking recommendations, and performing other related functions as described herein.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A method, comprising:
   receiving, by a first computing device and from a second computing device associated with a first vehicle, a parking recommendation request comprising trip data associated with the first vehicle;
   receiving data associated with one or more parking locations, wherein the data includes a corresponding availability of each of the one or more parking locations indicating whether that parking location is currently available or occupied;
   generating, based on the trip data and the data associated with the one or more parking locations, a current parking inventory;
   transmitting, to the second computing device, the current parking inventory;
   receiving, from the second computing device, an indication of a selection of a parking location from the current parking inventory; and
   based on determining that a corresponding availability of the selected parking location indicates that the selected parking location is currently occupied, transmitting, to a third computing device associated with the selected parking location, an offer to make the selected parking location available within a predetermined time period.

2. The method of claim 1, further comprising:
   receiving, from the third computing device, a response to the offer indicating an acceptance of the offer; and
   transmitting, to the second computing device, instructions to travel from a current location of the first vehicle to the selected parking location.

3. The method of claim 2, further comprising:
   transmitting, to the second computing device, a cost associated with acceptance of the offer and an estimated distance from the location of the first vehicle to the selected parking location.

4. The method of claim 3, further comprising:
   receiving, from the second computing device, an acceptance of the cost associated with acceptance of the offer and an estimated distance from the location of the first vehicle to the selected parking location.

5. The method of claim 4, further comprising:
   facilitating, in response to the acceptance of the cost associated with acceptance of the offer and an estimated distance from the location of the first vehicle to the selected parking location, a payment for the selected parking location utilizing stored payment information associated with the second computing device.

6. The method of claim 1, further comprising:
   receiving, from the third computing device, a response to the offer indicating a decline of the offer; and
   transmitting, to the second computing device, an indication of the decline of the offer.

7. The method of claim 6, further comprising:
   receiving, from the second computing device, an indication of a selection of a second parking location from the current parking inventory; and based on determining that a corresponding availability of the selected second parking location indicates that the second selected parking location is currently occupied, transmitting, to a fourth computing device associated with the selected second parking location, a second offer to make the second selected parking location available within a predetermined time period.

8. The method of claim 1, wherein the current parking inventory is further based on an indication maintenance schedule of the first vehicle.

9. The method of claim 1, wherein the current parking inventory is further based on a determined weather event associated with the first vehicle.

10. A system, comprising:
at least one processor; and
a memory storing computer-executable instructions that, when executed by the at least one processor, cause the at least one processor to:
receive, from a first computing device associated with a first vehicle, a parking recommendation request comprising trip data associated with the first vehicle;
receive data associated with one or more parking locations, wherein the data includes a corresponding availability of each of the one or more parking locations indicating whether that parking location is currently available or occupied;
generate, based on the trip data and the data associated with the one or more parking locations, a current parking inventory;
transmit, to the first computing device, the current parking inventory;
receive, from the first computing device, an indication of a selection of a parking location from the current parking inventory; and
based on determining that a corresponding availability of the selected parking location indicates that the selected parking location is currently occupied, transmit, to a second computing device associated with the selected parking location, an offer to make the selected parking location available within a predetermined time period.

11. The system of claim 10, wherein the memory stores instructions that, when executed by the at least one processor, further cause the at least one processor to:
receive, from the second computing device, a response to the offer indicating an acceptance of the offer; and
transmit, to the first computing device, instructions to travel from a current location of the first vehicle to the selected parking location.

12. The system of claim 11, wherein the memory stores instructions that, when executed by the at least one processor, further cause the at least one processor to:
transmit, to the first computing device, a cost associated with acceptance of the offer and an estimated distance from the location of the first vehicle to the selected parking location.

13. The system of claim 12, wherein the memory stores instructions that, when executed by the at least one processor, further cause the at least one processor to:
receive, from the first computing device, an acceptance of the cost associated with acceptance of the offer and an estimated distance from the location of the first vehicle to the selected parking location.

14. The system of claim 13, wherein the memory stores instructions that, when executed by the at least one processor, further cause the at least one processor to:
facilitate, in response to the acceptance of the cost associated with acceptance of the offer and an estimated distance from the location of the first vehicle to the selected parking location, a payment for the selected parking location utilizing stored payment information associated with the first computing device.

15. The system of claim 10, wherein the memory stores instructions that, when executed by the at least one processor, further cause the at least one processor to:
receive, from the second computing device, a response to the offer indicating a decline of the offer; and
transmit, to the first computing device, an indication of the decline of the offer.

16. The system of claim 15, wherein the memory stores instructions that, when executed by the at least one processor, further cause the at least one processor to:
receive, from the first computing device, an indication of a selection of a second parking location from the current parking inventory; and
based on determining that a corresponding availability of the selected second parking location indicates that the second selected parking location is currently occupied, transmit, to a third computing device associated with the selected second parking location, a second offer to make the second selected parking location available within a predetermined time period.

17. A non-transitory machine-readable medium storing instructions that, when executed by one or more processors, cause the one or more processors to perform steps comprising:
receiving, from a second computing device associated with a first vehicle, a parking recommendation request comprising trip data associated with the first vehicle;
receiving data associated with one or more parking locations, wherein the data includes a corresponding availability of each of the one or more parking locations indicating whether that parking location is currently available or occupied;
generating, based on the trip data and the data associated with the one or more parking locations, a current parking inventory;
transmitting, to the second computing device, the current parking inventory;
receiving, from the second computing device, an indication of a selection of a parking location from the current parking inventory; and
based on determining that a corresponding availability of the selected parking location indicates that the selected parking location is currently occupied, transmitting, to a third computing device associated with the selected parking location, an offer to make the selected parking location available within a predetermined time period.

18. The non-transitory machine-readable medium of claim 17, wherein the instructions, when executed by the one or more processors, further cause the one or more processors to perform steps comprising:
receiving, from the third computing device, a response to the offer indicating an acceptance of the offer; and
transmitting, to the second computing device, instructions to travel from a current location of the first vehicle to the selected parking location.

19. The non-transitory machine-readable medium of claim 18, wherein the instructions, when executed by the one or more processors, further cause the one or more processors to perform steps comprising:
facilitating, in response to an acceptance of a cost associated with acceptance of the offer and an estimated distance from the location of the first vehicle to the selected parking location, a payment for the selected parking location utilizing stored payment information associated with the second computing device.

20. The non-transitory machine-readable medium of claim 17, wherein the instructions, when executed by the one or more processors, further cause the one or more processors to perform steps comprising:

receiving, from the third computing device, a response to the offer indicating a decline of the offer;

transmitting, to the second computing device, an indication of the decline of the offer;

receiving, from the second computing device, an indication of a selection of a second parking location from the current parking inventory; and based on determining that a corresponding availability of the selected second parking location indicates that the second selected parking location is currently occupied, transmitting, to a fourth computing device associated with the selected second parking location, a second offer to make the second selected parking location available within a predetermined time period.

* * * * *